United States Patent
Pattekar et al.

(10) Patent No.: US 7,541,007 B2
(45) Date of Patent: Jun. 2, 2009

(54) MICROREACTOR AND METHOD OF USE TO PRODUCE HYDROGEN BY METHANOL REFORMING

(75) Inventors: Ashish V. Pattekar, Bethlehem, PA (US); Mayuresh V. Kothare, Bethlehem, PA (US)

(73) Assignee: Lehigh University, Bethlehem, PA (US)

( * ) Notice: Subject to any disclaimer, the term of this patent is extended or adjusted under 35 U.S.C. 154(b) by 848 days.

(21) Appl. No.: 10/742,004

(22) Filed: Dec. 19, 2003

(65) Prior Publication Data

US 2004/0179980 A1  Sep. 16, 2004

Related U.S. Application Data

(60) Provisional application No. 60/434,993, filed on Dec. 20, 2002.

(51) Int. Cl.
| | |
|---|---|
| *B01J 10/00* | (2006.01) |
| *B01J 10/02* | (2006.01) |
| *B01J 12/00* | (2006.01) |
| *B01J 12/02* | (2006.01) |
| *B01J 8/00* | (2006.01) |
| *B01J 8/02* | (2006.01) |
| *B01J 35/02* | (2006.01) |
| *B01J 19/00* | (2006.01) |
| *B01J 7/00* | (2006.01) |
| *A62D 3/00* | (2007.01) |
| *C23F 1/00* | (2006.01) |
| *H01L 21/311* | (2006.01) |
| *H01M 8/06* | (2006.01) |

(52) U.S. Cl. ............... 422/187; 422/129; 422/199; 422/211; 422/240; 216/2; 438/700; 48/61

(58) Field of Classification Search ............ 422/188, 422/198, 211, 240; 216/2; 438/700
See application file for complete search history.

(56) References Cited

U.S. PATENT DOCUMENTS 6,036,927 A * 3/2000 Chatterjee et al. ........... 422/211
(Continued)

FOREIGN PATENT DOCUMENTS

DE          19909180 A1 *  9/1999
WO      WO 0143857 A1 *  6/2001

OTHER PUBLICATIONS

EPO Machine Translation of DE 19909180 A1 (Sep. 9, 1999).*
(Continued)

*Primary Examiner*—Alexa D Neckel
*Assistant Examiner*—Matthew J Merkling
(74) *Attorney, Agent, or Firm*—RatnerPrestia

(57) ABSTRACT

Microreactor for carrying out methanol reforming for hydrogen production.

The microreactor consists of a network of catalyst-packed parallel microchannels of cross-sectional dimensions from 400 to 1000 micrometers with a catalyst particle filter near the outlet fabricated by micromachining techniques, e.g., using photolithography and deep-reactive ion etching (DRIE) on a silicon substrate. Microchannel and filter capping, on-chip heating and temperature sensing, introduction and trapping of catalyst particles in the microchannels, flow distribution, microfluidic interfacing and thermal insulation are features of the microreactor.

Another microreactor consists of a radial-flow configuration utilizing a annular shaped catalyst zone for carrying out reactions between gases introduced into the microreactor as the gases flow from an inner circular boundary to an outer circular boundary in a radial direction.

Methanol to hydrogen molar conversion of at least 85% to 90% at flow rates enough to supply hydrogen to an 8 to 10 Watt fuel cell have been achieved.

Microreactors according to the invention can be achieved to produce hydrogen as required for up to a 25 Watt fuel cell. Several such microreactors can be used simultaneously to generate hydrogen for fuel cells with higher power capacities.

27 Claims, 18 Drawing Sheets

U.S. PATENT DOCUMENTS

| | | | |
|---|---|---|---|
| 6,541,676 B1 | | 4/2003 | Franz et al. |
| 6,569,553 B1 | | 5/2003 | Koripella et al. |
| 6,749,814 B1 | * | 6/2004 | Bergh et al. ............... 422/130 |
| 6,932,951 B1 | * | 8/2005 | Losey et al. ............... 422/211 |
| 2002/0053164 A1 | * | 5/2002 | Brauchle et al. ........... 48/197 R |
| 2003/0103878 A1 | | 6/2003 | Morse et al. |
| 2003/0180216 A1 | * | 9/2003 | TeGrotenhuis et al. ...... 423/659 |
| 2003/0194359 A1 | | 10/2003 | Gervasio et al. |
| 2003/0194362 A1 | | 10/2003 | Rogers et al. |
| 2003/0194363 A1 | | 10/2003 | Koripella et al. |
| 2006/0159592 A1 | * | 7/2006 | Andersson et al. ........... 422/100 |

OTHER PUBLICATIONS

R. Srinivasan et al., "Chemical Performance and High Temperature Characterization of Micromachined Chemical Reactors", IEEE, Jun. 1997, pp. 163-166.

R. Srinivasan et al., "Micromachined Reactors for Catalytic Partial Oxidation Reactions", AIChE Journal, vol. 43, No. 11, Nov. 1997, pp. 3059-3069.

S. C. Kelley et al., "Miniature Fuel Cells Fabricated on Silicon Substrates", AIChE Journal, vol. 48, No. 5, May 2002, pp. 1071-1082.

S. K. Ajmera et al., "Microfabricated Packed-Bed Reactor for Phosgene Synthesis", AIChE Journal, vol. 47, No. 7, Jul. 2001, pp. 1639-1647.

M. W. Losey et al., Microfabricated Multiphase Packed-Bed Reactors: Characterization of Mass Transfer and Reactions, Ind. Eng. Chem. Res., vol. 40, No. 12, 2001, pp. 2555-2562.

A. V. Pattekar et al., "A Microreactor for In-situ Hydrogen Production by Catalytic Methanol Reforming", Proceedings of the 5$^{th}$ International Conference of Microreaction Technology (IMRET 5), Strasbourg, France, May 2001.

J. Hu et al., "Fuel Processing for Portable Power Applications", Chemical Engineering Journal 93, 2003, pp. 55-60.

D. R. Palo et al., "Development of a Soldier-Portable Fuel Cell Power System Part I: A Bread-Board Methanol Fuel Processor", Journal of Power Sources 108, 2002, pp. 28-34.

A. Y. Tonkovich et al., "Microchannel Reactors for Fuel Processing Applications I. Water Gas Shift Reactor", Chemical Engineering Science 54, 1999, pp. 2947-2951.

Poster Slides Presented by Mayuresh Kothare and Ashish Pattekar at the 5th International Conference on Microreaction Technology held on May 27-30, 2001 in Strasbourg, France.

Microfabricated Devices for Multiphase Catalytic Processes, Losey et al., IMRET 4: 4th International Conference on Microreaction Technology, 2000.

* cited by examiner

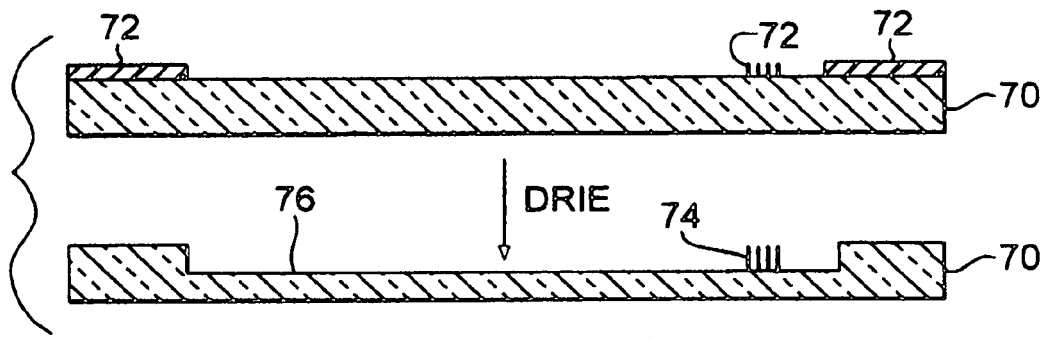
FIG. 6a1
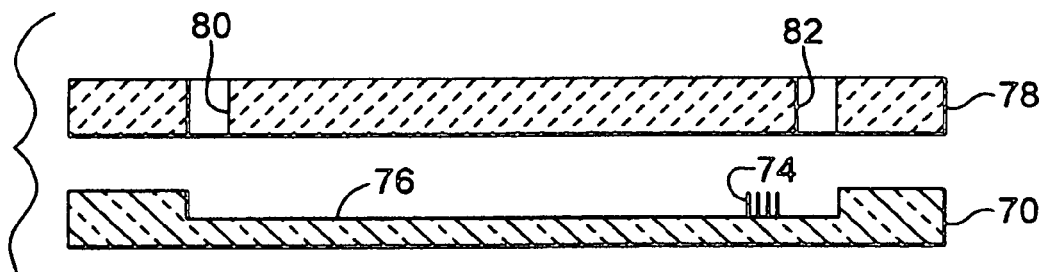
FIG. 6a2
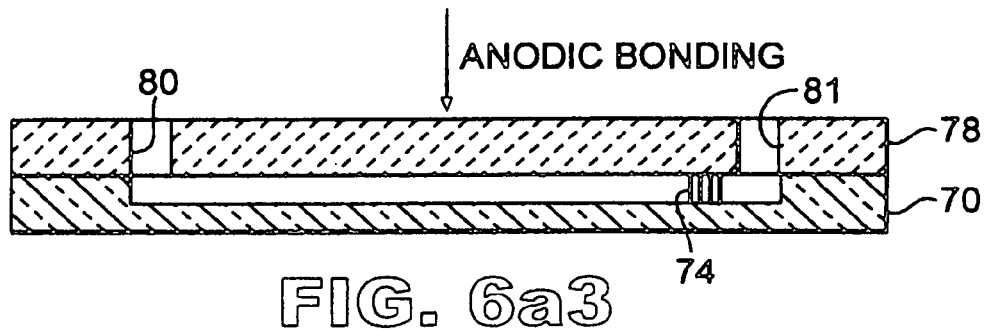
FIG. 6a3

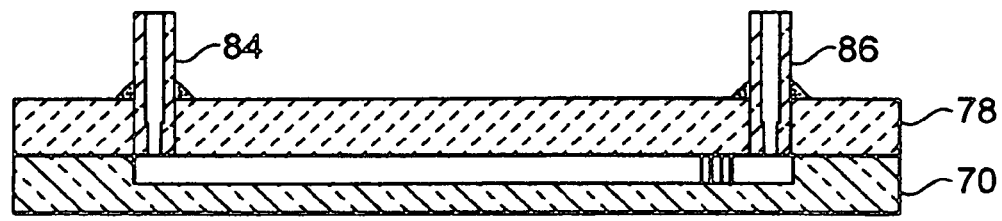
FIG. 6a4
FLOW OF CATALYST PARTICLE SUSPENSION
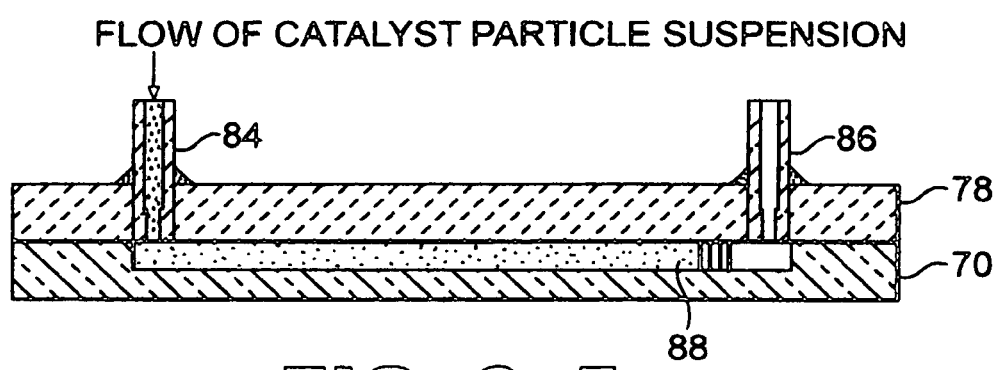
FIG. 6a5

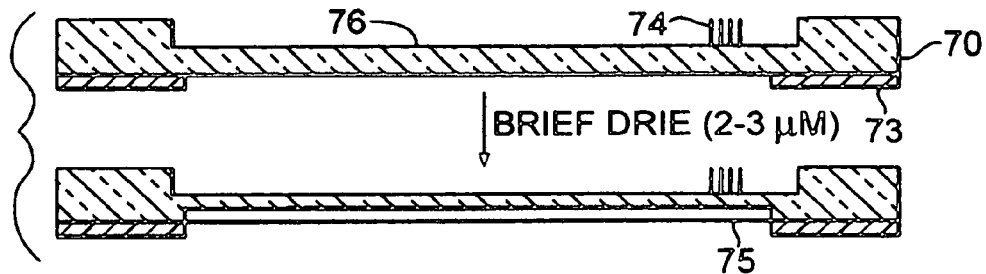
FIG. 6b1
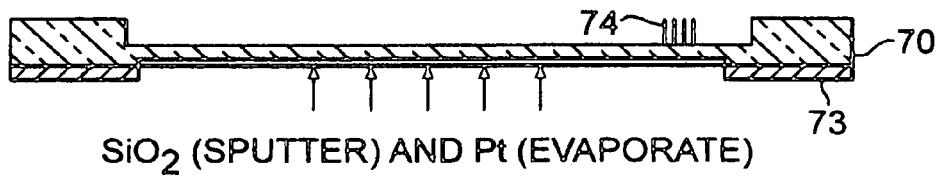
FIG. 6b2
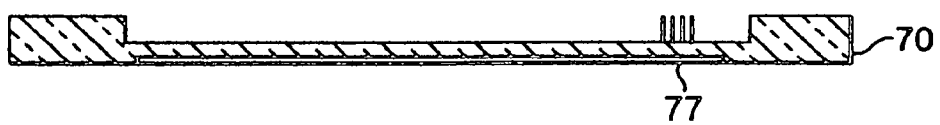
FIG. 6b3
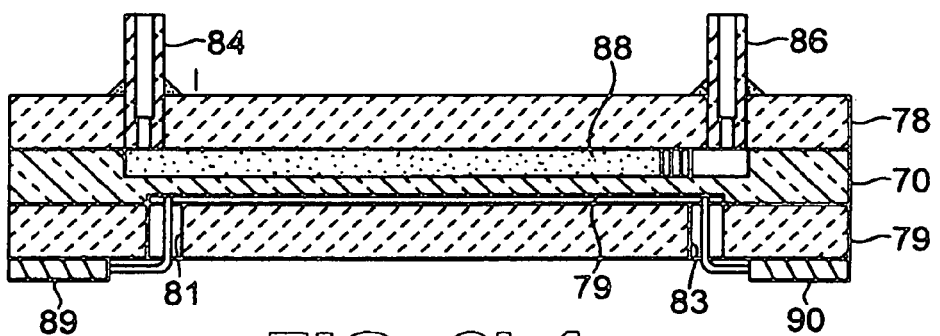
FIG. 6b4

US 7,541,007 B2

MICROREACTOR AND METHOD OF USE TO PRODUCE HYDROGEN BY METHANOL REFORMING

CROSS REFERENCE TO RELATED APPLICATIONS

This application claims the benefit of U.S. Provisional Patent Application Ser. No. 60/434,993 filed Dec. 20, 2002.

BACKGROUND OF THE INVENTION

The present invention pertains to silicon-based microreactors for use in the field of microreaction engineering.

The state-of-the-art power source currently in use for portable electronic devices is the rechargeable lithium-ion battery, whose popularity has been steadily rising since its introduction in the early 1990s. From a small share of about 1.5% in 1994 in the portable electronic devices' battery market, the lithium-ion battery has enjoyed increasing acceptance, leading to a 72.1% market share in 1997 and 82% in 1998. The worldwide market for batteries in 2001 was estimated at $37.7 billion, which can be divided into rechargeable ($24.9 billion in sales in 2001) and primary (disposable) batteries ($12.8 billion in sales in 2001). Today the fastest growing product category in the battery industry is that of small, high performance batteries, such as rechargeable nickel metal hydride and lithium ion, and various primary batteries for use in portable electronic devices. This segment accounts for more than $16 billion in sales worldwide and is growing at nearly 8% per year. These battery types serve high growth markets such as notebook computers, cellular telephones, camcorders, digital cameras, cordless telephones and hand-held computers, the total sales for which were estimated to be over 600 million units in 2001.

The rechargeable batteries, however, suffer from a significant drawback: the charge carrying capacity is quickly approaching the theoretical maximum as development continues. Also, the charging cycles remain slow and tedious. At the same time, the ever-increasing functionality of portable electronic devices means that more and more power is required to operate them. Progress in portable device technology thus puts a lot of demand on the portable power sources, resulting in more frequent and tedious recharging cycles. The energy-dense PEM fuel cell, with potential energy storage densities about 7 to 8 times that of the state-of-the art rechargeable batteries, can thus be expected to provide a viable alternative to the battery as a portable power source. A major problem in the commercialization of the portable fuel cell has been difficulty and hazards involved in storage of hydrogen (either liquid or compressed) which is used as fuel.

The use of microreactors for in-situ and on-demand chemical production is gaining increasing importance as the field of microreaction engineering matures from the stage of being regarded as a theoretical concept to a technology with significant industrial applications. Various research groups have successfully developed microreactors for chemical processing applications such as partial oxidation of ammonia, nitration and chemical detection. The objective of the research effort at the Integrated Microchemical Systems Laboratory at Lehigh University's Chemical Engineering Department was to demonstrate a working microreaction system for use as a sustained source of hydrogen fuel for proton exchange membrane (PEM) fuel cells through catalytic steam reforming of methanol. The complete reformer-fuel cell unit is proposed as an alternative to conventional portable sources of electricity such as batteries for laptop computers and mobile phones due to its ability to provide an uninterrupted supply of electricity as long as a supply of methanol and water can be provided. Though considerable work already exists in the literature on the catalytic steam reforming of methanol for production of hydrogen using conventional reactors, the use of microreactors for in-situ methanol reforming is a relatively new idea. Literature on the macro-scale steam reforming of methanol includes analysis of the reaction thermodynamics for prediction of optimum reactor temperature and feed compositions, catalyst characterization studies, and experimental studies on macro-scale pilot reactors. Results obtained in the study of methanol reforming in these conventional reactors form a good background for the development of prototype microreactors for this purpose. Silicon is considered a good material for fabrication of microreactors due to the high strength of the Si-Si bonds which results in the chemical inertness and thermal stability of silicon. Well established silicon micromachining techniques commonly used in the microelectronics industry facilitate easy fabrication of microchannels and other desired features on silicon substrates thus making silicon the preferred material for prototype microreactor fabrication.

SUMMARY OF THE INVENTION

The present invention solves the problem of hydrogen handling and storage for miniature fuel cells by in-situ reforming of methanol to generate hydrogen through a chemical reaction carried out in a unique microreactor designed for this purpose. Thus the hydrogen required by the fuel cell can be stored safely in the form of liquid methanol and generated on-demand as and when needed. This is expected to be an enabling technology for miniature fuel cells and has the potential to cause a significant impact on the portable power market.

Preliminary runs of the microreactor have shown a methanol to hydrogen conversion of at least 85% to 90% at a flow rate enough to supply hydrogen to an 8 to 10 Watt fuel cell.

Thus, in one aspect the present invention is a microreactor having at least two interconnected and parallel paths micromachined in a silicon wafer, the paths being parallel generally serpentine paths from an inlet to an outlet to promote equal residence time of fluids flowing across said parallel paths, and a filter for trapping catalyst particles positioned proximate to said outlet of said reactor.

A microreactor comprising in combination: a substrate having micro-machined therein a plurality of separate microchannels, each microchannel communicating with an inlet and outlet of the reactor; a filter proximate an outlet conduit of the reactor to prevent catalyst particles loaded into the microchannels from passing out of the reactor; and means to effect a gas tight seal separately with each of the inlet and the outlet of the reactor.

In another aspect the present invention is a method of catalyst loading of a microreactor fabricated by micro-machining a plurality of one of channels, passages, paths or reaction chambers in a suitable substrate to define a continuous generally serpentine path from an inlet to an outlet with a filter for trapping catalyst particles proximate to the outlet of the reactor comprising the steps of: a) preparing a fluid-based suspension of catalyst particles of a desired particle size range; b) introducing the suspension into the inlet of the reactor under pressure while drawing a vacuum at the outlet of the reactor; and c) continuing step (b) until the channels are packed with catalyst.

In yet another aspect the present invention is a microreactor having at least one radial passage, channel or path micromachined in a suitable substrate, the passage, channel or path defining at least one radially extending path from a central inlet to an outer boundary outlet generally concentric to said inlet.

In still another aspect the present invention is a method of catalyst loading of a microreactor fabricated by micro-machining at least one radial passage in a suitable substrate to define a plurality of radial passages extending from a central inlet to a boundary outlet of the reactor comprising the steps of a) preparing a fluid-based suspension of catalyst particles of a desired particle size range; b) introducing the suspension into the inlet of the reactor under pressure while drawing a vacuum at the outlet of the reactor; and c) continuing step (b) until the radial passages are packed with catalyst.

Yet another aspect of the present invention is a method for producing hydrogen by reaction of methanol and water vapor in the presence of a catalyst comprising the steps of: a) loading one of the channels or reaction chambers of a microreactor with a low temperature shift/methanol reforming catalyst; b) heating the reactor to a temperature of from 195° C. to 275° C.; c) introducing methanol and water vapor into an inlet of the reactor; and d) withdrawing a hydrogen product stream from an outlet of the microreactor.

BRIEF DESCRIPTION OF THE DRAWINGS

FIG. 6(a)1-FIG. 6(a)5 is a schematic representation of the steps used to form the microchannel and catalyst particle filter portion of a microreactor according to the present invention.

FIG. 6(b)1-FIG. 6(b)4 is a schematic representation of the steps used to form the heater and electrical connections for a microreformer according to the present invention.

DETAILED DESCRIPTION OF THE INVENTION

For the purpose of explaining the present invention a micro-reformer/microreactor is a device having reaction channels or fluid flow paths having a width and/or depth generally 2000 micro-meters or less but greater than 10 micro-meters.

Fabrication of reactor microchannels of cross section dimensions 1000 μm×230 μm on the prototype silicon reformer chips was carried out using standard silicon micromachining techniques such as Photolithography and KOH etching. A single mask process was used to produce four identical microreformers from a single 100 mm silicon wafer polished on both sides. Silicon nitride was deposited by plasma enhanced chemical vapor deposition (PECVD) on both sides of the wafer. Photolithography was done on the back side of the wafer to obtain the microchannel pattern. Silicon nitride on the back side was then etched by plasma etch to produce patterned nitride which acts as an etch stop during KOH etching of silicon. Bulk silicon was etched in KOH from the back side to obtain microchannels of desired depths. About 33 nm of copper (catalyst layer) was then sputter deposited. FIG. 1 illustrates the major steps involved in the fabrication of the microreformer chips.

Figure 1A:
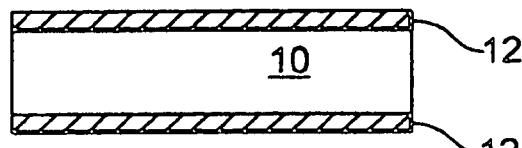
FIG. 1a-FIG. 1e is a schematic representation of the fabrication steps for forming the microchannels of a microreformer according to an aspect of the invention.
Figure 1B:
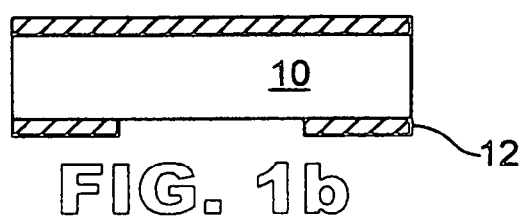
Figure 1C:
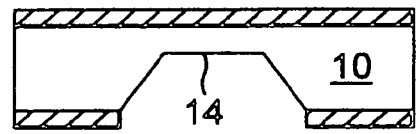
Figure 1D:
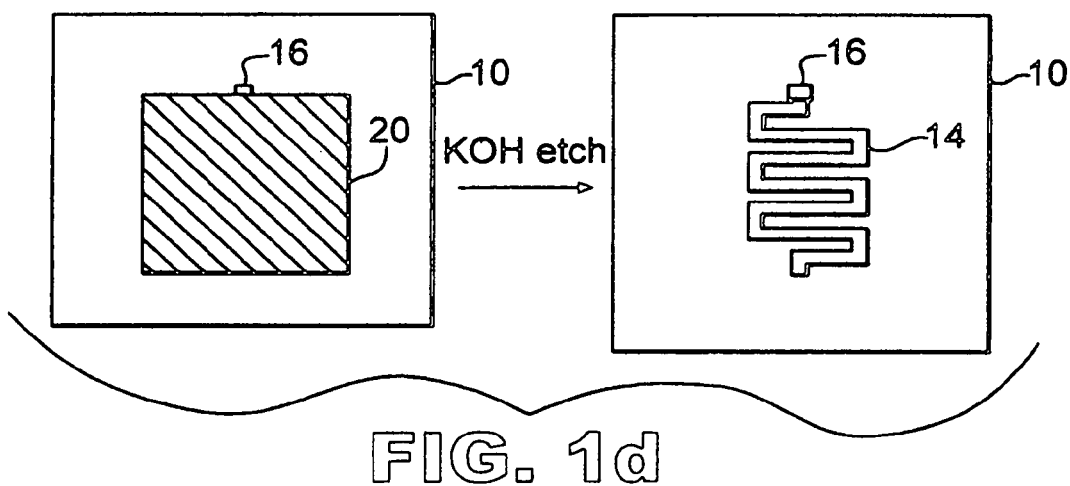
Figure 1E:
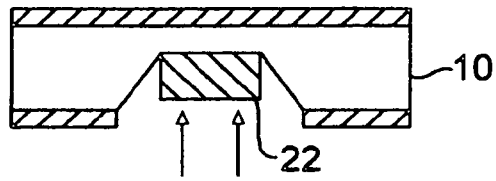
Figure 2:
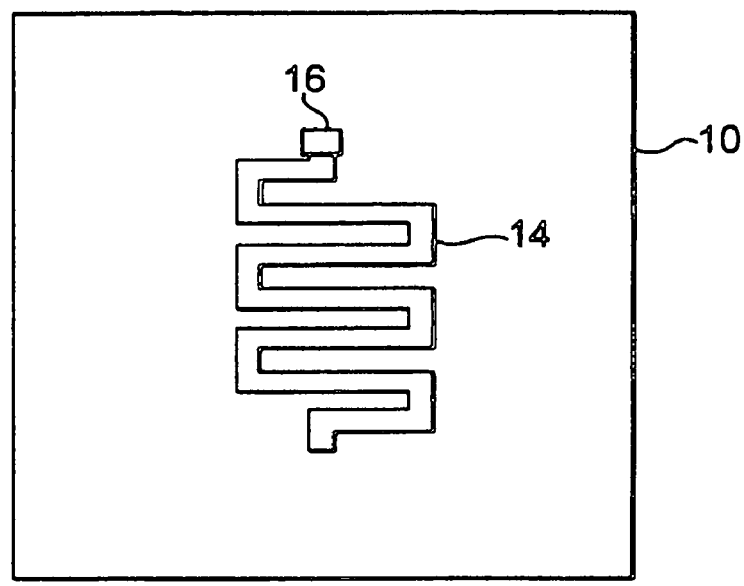
FIG. 2 is a schematic top plan view of the microreformer according to FIG. 1.

Referring to FIG. 1 a first step in fabricating a test reactor comprised coating a silicon wafer 10 with a nitride coating 12. FIG. 1b shows a second step consisting of plasma etching patterned nitride on one side of the wafer 10 to expose a portion of the wafer 10 underlying the nitride coating 12. FIG. 1c illustrates a next step consisting of etching a portion of the bulk silicon 10 in order to produce the channel configuration 14 in the substrate 10. FIG. 1d illustrates formation of an inlet passage 16 on an end of the passage 14 by covering the entire passage 14 with a black wax coating 20 and etching the inlet passage 16 into the substrate. As will be discussed below regarding the experimental set-up and external interfacing of the microreformer, one end of the channel 14 needs to have an inlet passage or hole 16 in the silicon substrate 10 for the dosing of reactants into the channels. This hole 16 was made after fabrication of the channels by etching through the wafer with KOH. A protective coating of black wax prevented etching of the rest of the wafer. This technique exposes only one end of the channel (an area of approximately 1 mm²) to the etchant, which results in the desired passage or hole 16 after completion of the etching process. FIG. 2 shows a schematic of the final reformer chip 10, with the inlet hole 16 and the microreformer passage 14. FIG. 1e illustrates a further step of depositing a layer of copper 22 into the microreactor passage 14.

As shown in FIG. 2 the final reformer chip consists of the inlet passage 16 communicating with the main passage 14 of the reactor.

Figure 3:
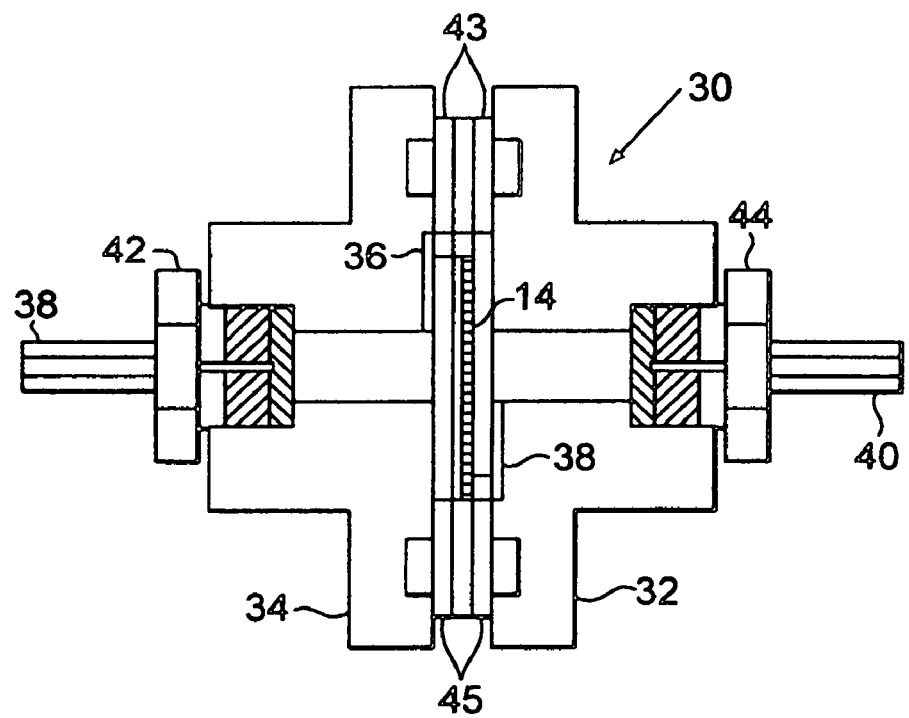
FIG. 3 is a schematic representation of the test housing for a microreformer according to the present invention.

The interfacing of the microreformer chip to tubing for reactant and product gas transport was done using a custom made stainless steel housing 30 shown in FIG. 3. As shown in FIG. 3 the housing 30 made in two halves 32, 34 which contain internal passage or ridges 36, 38 to permit gas flow to the microreformer channels 14. The reactants are introduced through an inlet tube 38 and product or exhaust gases are removed via an exhaust or outlet 40. Inlet 38 and outlet 40 are connected to the steel housing 30 via suitable fittings (e.g. Swagelok connectors 42, 44 respectively).

The steel housing 30 blocks or halves 32, 34 have ridges of appropriate length connecting a central bore to appropriate points on the reformer 10. Ridge 36 on housing 30 half 34 was machined to face the reactant inlet hole on the reformer chip when the chip was properly aligned with the housing 30. Similarly, the product gases exit from the other end of the channel through a ridge 38 in the housing half 32 machined to face the other end of the channel 14 when the two halves 32, 34 of housing 30 are aligned correctly.

Leak-proof sealing between the reformer chip 10 and the steel housing 30 was ensured by using flexible graphite pads 43, 45 acting as gaskets with holes drilled at the correct positions for reactant and product transport. Thus the reformer chip 10 was covered from either side by a graphite covering pad to provide a leak-proof conduit for reactant and product gas transport between the housing and the reformer. The tubing for gas transport was connected to both sides of the housing via standard Swagelok connectors so that the reactants entered the housing-microreformer assembly from one side, passed to the microreformer through the hole in the silicon substrate and exited the reformer through a similar hole in the covering graphite pad at the other end of the microchannel after flowing over the deposited catalyst. The advantage of using flexible graphite pads for sealing purposes was that graphite being a good conductor of heat, the reactor temperature could be maintained at 250° C. by heating the steel housing using heating tapes and suitable temperature controllers. This allowed testing of the reformer chip without having to fabricate on-chip resistive heaters and temperature sensors, which will be integrated with the microreformer as explained hereinafter.

The operation of the microreformer involved:
1. Setting up of the methanol vapor and steam source
2. Interfacing of the microreformer chip to external tubing for transport of reactants and products as discussed above, and
3. Connection of the reactor exhaust tubing to the gas analysis equipment (a quadrupole mass spectrometer) for online analysis of the product gas composition.

Figure 4:
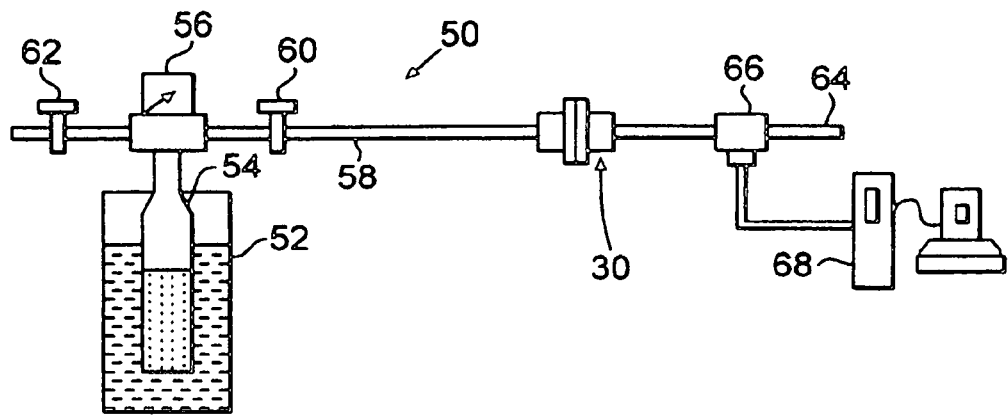
FIG. 4 is a schematic representation of the experimental apparatus used with the test housing of FIG. 3.

A gas-tight sample cylinder containing a liquid methanol-water mixture immersed in a constant temperature hot water bath maintained at temperatures in the range 80° C.-95° C. was used for generation of methanol vapor-steam mixtures of desired compositions by manipulating the composition of the liquid mixture to the sample cylinder on the basis of methanol-water vapor-liquid equilibrium (VLE) data. Analysis of the VLE data for the mixture and pressure drop calculations from simulations using MEMCAD confirmed that enough pressures could be generated in is this set-up to drive the flow of the reactants through the reformer. The product gas tubing coming from the microreformer housing connected to the mass spectrometer, which gave an online analysis of the composition of the product gases. FIG. 4 shows a schematic of this set-up.

As shown in FIG. 4 the experimental set-up 50 consists of a hot water bath 52 to contain a sample cylinder 54. The sample cylinder 54 was connected through a pressure sensor 56 to an inlet conduit 58 which contained a suitable flow control valve 60 and a pressure relief valve 62. The inlet conduit 58 was connected to the microreformer housing 30 and heated to 250° C. using heating tapes. Conduit 58 terminated in a reactor exhaust conduit 64. Conduit 58 contained a fitting 66 which enabled effluent from the microreformer housing 30 to be analyzed in a mass-spectrometer 68.

Electric heating tapes and simple on-off controllers with thermocouple probes were used to maintain the temperature of the connecting tubing above 100° C. to avoid condensation of the vapors during flow. A pressure transducer-strain gage meter combination was used to continuously monitor the pressure in the sample cylinder. The reactor housing was also maintained at the temperature required for he reforming reaction (around 250° C.) using electric heating tapes and an auto-tuning PID controller with a thermocouple sensor which maintained the reactor temperature to within 1° C. of the setpoint.

The gas analyzer used for analysis of the product gas composition was a quadrupole ion-trap mass spectrometer based residual gas analyzer (RGA) with a pressure-reducing inlet allowing the sampling of gases at atmospheric pressure. The pressure reducing inlet capillary of the analyzer was also maintained at above 100° C. using heating tapes to avoid any condensation before the pressure was sufficiently reduced to obviate condensation of water and methanol at room temperature inside the capillary. The mass spectra were collected at short intervals and the peak amplitudes were converted to mole fraction data for conversion calculations.

Figure 5:
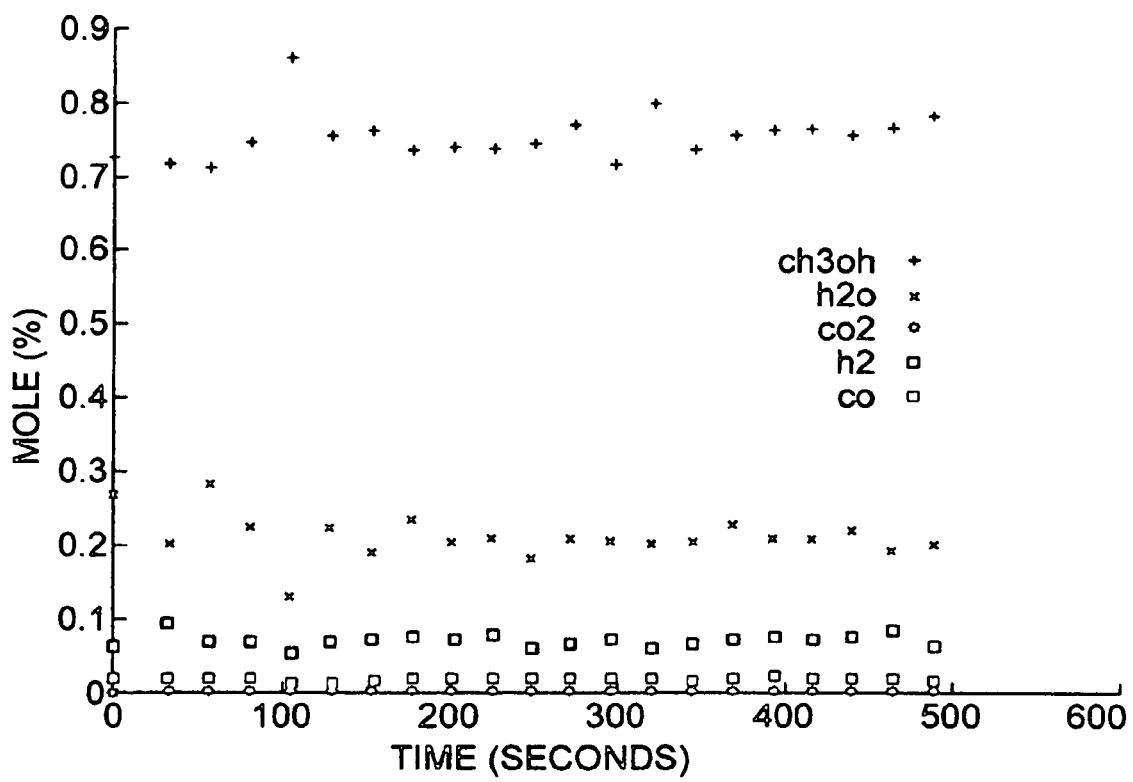
FIG. 5 is a plot of product gas composition in mole fraction against time in seconds.

Test runs of the microreformer were carried out to verify hydrogen production capability inside the microreformer and to approximate the conversion rates using this set-up. The preliminary runs gave important insights into the operation of the microreformer in this set-up. For one of the test runs a 50:50 mixture of methanol and water was fed into the sample cylinder maintained at 85° C. using a hot water bath. Using methanol-water VLE data at 85° C. obtained using the UNIFAC method in Aspen Plus, the vapor mixture at equilibrium with this liquid will have methanol vapor mole fraction ($Y_{methanol}$) of about 0.76. The methanol vapor-steam mixtures generated in this manner were passed through the reformer maintained at 250° C. and the product gas mass spectra were obtained at regular intervals during the run. The mass spectra were converted to mole fraction data using the library for molecule fragmentation inside the mass spectrometer ionizer. A plot of the exit gas composition (mole fraction) v/s time (sec.) for a microreformer test run of 500 sec is shown in FIG. 5. As can be seen from the plot, a sufficient amount of hydrogen was detected at the reactor exit to confirm that reforming was indeed taking place in the microreactor.

Average values of the mole fraction of each component in the product gas for this run can be used to get a crude estimate of the hydrogen yield. These values were 0.755 for methanol, 0.21 for water, 0.070 for hydrogen, 0.00129 for carbon dioxide and 0.017 for carbon monoxide. Though the hydrogen yield obtained in this prototype unoptimized microreactor was not significant (approximately about 0.092 moles $H_2$ produced per mole $CH_3OH$ fed into the reformer with an average flow rate of about $2.36 \times 10^{-3}$ gm/sec of methanol-steam mixture at the microreformer inlet with inlet methanol mole fraction of 0.76) these results demonstrate the capability to carry out methanol reforming in a microreactor and to test the microreactor operation at different operating conditions. Increasing the catalyst contact area per unit channel length and optimizing microchannel geometries result in more efficient utilization of available total chip area and higher hydrogen production rates corresponding to higher methanol conversions as explained below.

Referring to the chemical reactions (equations 1, 2 and 3 below) it should be noted that the amount of CO and $CO_2$ produced in the test runs as obtained from the mass spectra was less than what would be expected from the reaction stoichiometry for the observed production of $H_2$.

Primary reactions:

$$CH_3OH + H_2O \Leftrightarrow CO_2 + 3H_2 \quad (\Delta H_{298K} = 48.96 \text{ KJ/mol}) \quad (1)$$

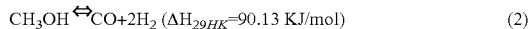

$$CH_3OH \Leftrightarrow CO + 2H_2 \quad (\Delta H_{29HK} = 90.13 \text{ KJ/mol}) \quad (2)$$

Secondary Reaction:

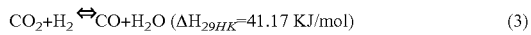

$$CO_2 + H_2 \Leftrightarrow CO + H_2O \quad (\Delta H_{29HK} = 41.17 \text{ KJ/mol}) \quad (3)$$

One possible reason for this could be the deposition of minute quantities of carbon during the reaction in the microchannels which would reduce the amount of CO and $CO_2$ present in the exit gases. Carbon deposition on the catalyst surface can have several undesirable effects affecting the product purity. It was also observed that the copper layer in the microreformer degraded and turned blue after several test runs probably due to the formation of some compound of copper in the presence of the reaction mixture at the high reforming temperature of 250° C. Catalyst deactivation will lead to lower yields and catalyst regeneration will have to be incorporated for restoring good efficiency of the reformer operation.

A prototype silicon based microreformer was successfully fabricated and tested using a setup designed for easy operation and replacement of microreformer chips and testing of different microreformer designs. Preliminary results from the test runs confirmed the presence of hydrogen at the reformer exit and revealed the need for extensive optimization of the reformer design for obtaining good hydrogen yields. Catalyst degradation in the microchannels was also observed. Optimization of the reformer design and methods to deal with catalyst deactivation issues will be discussed below.

Microchannels of depth ranging from 200 μm to 400 μm and width of 1000 μm and capillary interfacing inlet-outlet ports of the same depth and width of 2000 μm are fabricated in 1000 μm thick silicon substrates using photolithography followed by Deep Reactive Ion Etching (DRIE) technique are shown in FIG. 6(a)1 through FIG. 6(a)5. Referring to FIG. 6(a)1 patterned photoresist coating 72 of up to 10 microns thickness (Shipley 1045, single/dual coat) is used as the etch mask for DRIE of substrate 70. The patterned photoresist is such that filter walls 74 are created in the etched microchannel 76 as shown in FIG. 6(a)1. The top of the open microchannel 76 of the processed silicon wafer 70 is subsequently aligned and anodically bonded to a Pyrex capping wafer 78 (thickness 1.8 mm) with mechanically drilled holes 80, 82 at precise positions corresponding to the inlet and outlet of the channel 76 on the silicon wafer 70 as shown in FIG. 6(a)2 and FIG. 6(a)3 to obtain microchannel conduits enclosed between the silicon 70 and glass capping wafer 78. The diameter (1.75 mm) of each hole 80, 82 in the Pyrex wafer 78 is slightly larger than the outer diameter of the Teflon (PTFE) capillary (1.68 mm) used in the interconnection to ensure that the capillary can be passed freely through the hole without excessive clearance. As shown in FIG. 6(a)4 Teflon capillary tubes 84, 86 are bonded into holes or passages 80, 82 by a method to be discussed below. As shown in FIG. 6(a)5 catalyst is introduced into the microchannel 76 through the inlet capillary 84 to form a micro-packed bed 88.

As shown in FIG. 6(b)1 through FIG. 6(b)4 a prototype device according to the invention was also fitted with heater/temperature sensor lines to raise and control the temperature of the catalyst bed 86. Referring to FIG. 6(b)1 and FIG. 6(b)2 the side of substrate 70 opposite to channel 76 was patterned as shown by photoresist 73 to produce heater trenches 75. As shown in FIG. 6(b)3 the trenches 75 are filled with a Platinum deposit to create the heater lines 77. As shown in FIG. 6(b)4 the final device has, in addition to the structure of FIG. 6(a)5, a bottom capping wafer 79 with holes 81, 83 so that electrical leads 85, 87 can connect heater lines 77 to a temperature controlled through bond pads 89, 90 to effect heating of catalyst bed 86.

A Teflon (PTFE) capillary is used in the fabrication of the interconnect due to its high melting point (in excess of 327° C.) and inertness to most chemicals including concentrated acids and bases. However, the presence of fluorine atoms on the surface of PTFE renders it unwettable and unbondable with conventional epoxies. There have been several studies on improving the surface wettability and bondability properties of PTFE using surface modification methods. Of these methods, the chemical etching method using a sodium naphthalene solution which has been the industry standard for many years was employed.

The PTFE capillary is chemically treated by immersing in a sodium/naphthalene complex solution (sold under the trade designation FluoroEtch by, Acton Technologies Inc.) maintained at 55° C. for one minute. This is followed by rinsing in methanol for 20 seconds to dissolve the excess naphthalene and decompose the 2-Methoxyethylether solvent in the etchant. Hot (70° C.), mildly acidic water (glacial acetic acid solution with pH of 5) is subsequently used for rinsing and neutralizing the alkalinity of the etchant. Finally the etched capillary is rinsed in deionized water and dried in hot air. This process results in defluorination and introduction of carbonyl and carboxylic acid groups on the surface, rendering the PTFE wettable and bondable using conventional epoxies.

As noted above the diameter of the inlet/outlet holes drilled in Pyrex is slightly larger than the outer diameter of the Teflon capillary, so that the capillary can be passed easily through the holes without excessive clearance. A clearance of about 70 μm for a 1.68 mm outer diameter capillary or about 4% of the capillary diameter was found to be suitable for this purpose. In order to use epoxy for bonding the capillary permanently to the top Pyrex wafer, it should have a low enough viscosity (typically less than 1000 cP) so that it flows around the capillary evenly and seals the interconnect boundary completely. However, a low-viscosity epoxy can easily seep in and block the microchannels so such a design usually involves the formation of a temporary seal to prevent any seepage. Some researchers have used on-chip fusing of polyethylene tubing to form such a temporary seal while others used a micromachined mylar film for this purpose. For the present invention a method based on localized high-temperature deformation of the capillary to obtain in-situ temporary sealing was developed. The advantage of this method is that it involves fewer fabrication steps and does not introduce any other material except Teflon in the interconnect. This ensures chemical inertness and better thermal stability of the interconnect.

Figure 7A:
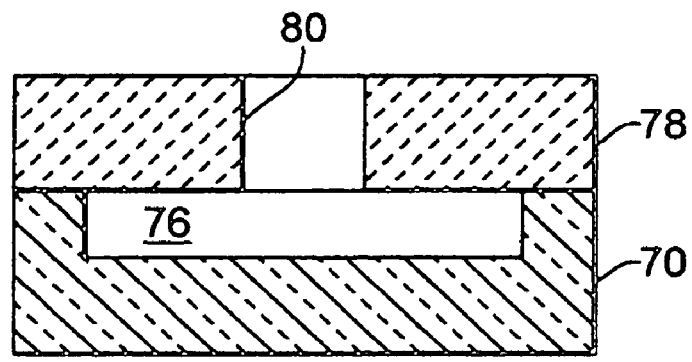
FIG. 7a-FIG. 7d are schematic representations of the steps used in capillary insertion and deformation bonding used to form microfluidic interconnections according to the present invention.
Figure 7B:
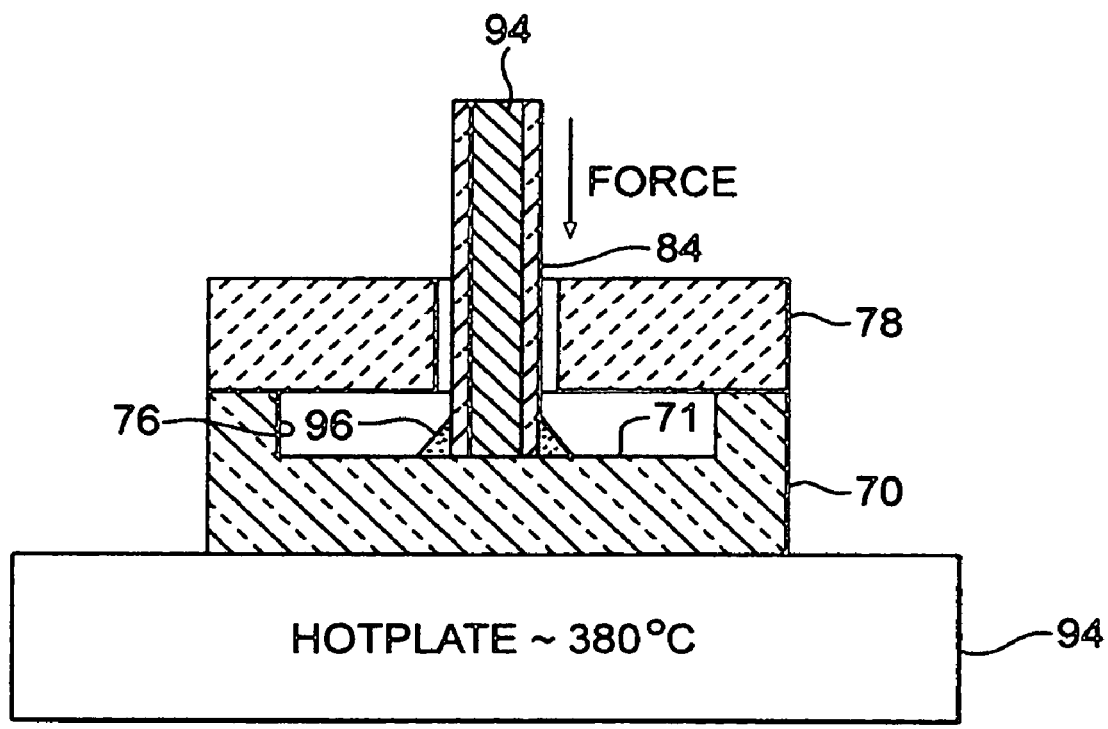

FIG. 7(a) through FIG. 7(d) show the major steps involved in creating the microfluidic connections. The Teflon capillary 84, after surface treatment, is introduced into the fluidic inlet port 80 shown schematically in capping wafer 78 placed on substrate 70 in FIG. 7a). The device 70, 78 itself is maintained at about 380° C. using a hotplate 94. The capillary 84 is briefly pressed against the top surface 71 of the channel 76 in the substrate 70 for 4-5 sec. to allow for melting of the capillary at the inserted end, as shown in FIG. 7b. A metal guide wire 94 is used to ensure that the deformation, after melting, takes place in the outward direction and the capillary 84 does not collapse due to the force.

Figure 7C:
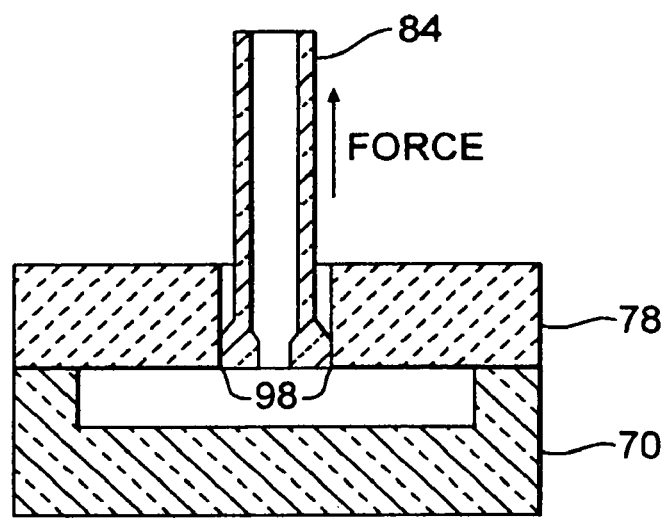
Figure 7D:
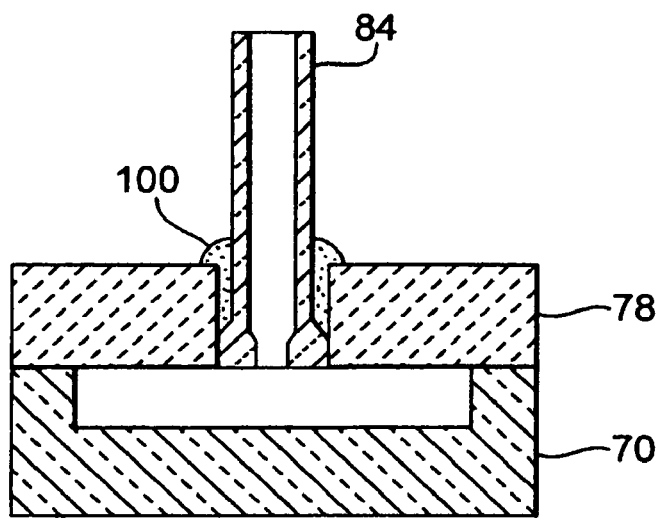

The brief melting shown as 96 at the inserted end of the Teflon capillary 84 leads to the formation of an integrated 'o-ring' with an outer diameter slightly larger than that of the hole 81 drilled in Pyrex capping wafer 78. Subsequent pulling of the capillary 84 upwards as shown in FIG. 7c results in the formation of a temporary seal 98 at the connection port 81. Finally, the capillary 84 is permanently bonded to the Pyrex capping wafer 78 using a high temperature epoxy 100 sold under the trade designation Duralco 4460, by Cotronics Corp. The epoxy 100 is then cured at 120° C. for 4 hours to obtain the desired bond strength, as shown in FIG. 7d. It must be noted that the specific dimensions of the fabricated interconnects were chosen to ensure ease of practical handling. The procedure itself can be appropriately scaled up/down to larger/smaller capillaries and inlet/outlet ports if needed.

Figure 8A:
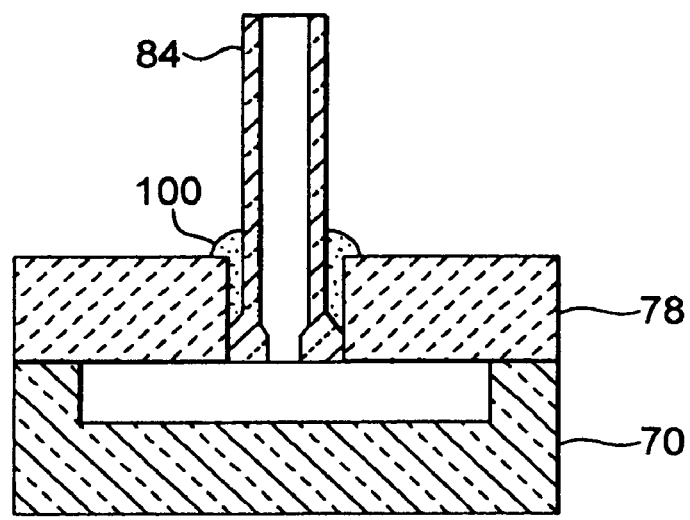
FIG. 8a and FIG. 8b are schematic representation of the reinforced interconnect of FIGS. 7a-7d.
Figure 8B:
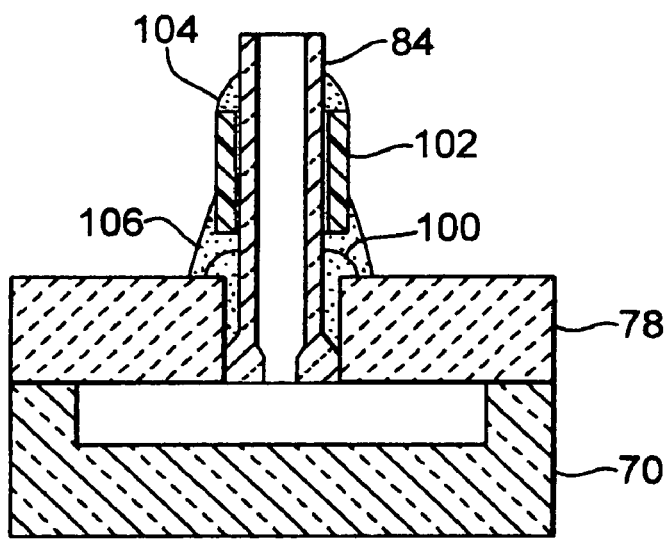

During the strength characterization of the interconnect discussed in detail above, it was found that the primary point of failure of the interconnect due to wear and tear caused by significant amount of handling (including moving the device around the lab for testing and repeatedly flexing the bonded capillary) was at the boundary of the cured epoxy 100 and the Teflon capillary 84, as shown in FIG. 8a. To further improve the operating life of the interconnect a sleeve 102 (FIG. 8b) made by cutting a small length (3 mm) of Teflon tubing with internal diameter equal to the outer diameter of the capillary 84 (1.68 mm) and surface etched as discussed above is placed over the capillary 84 before making the interconnect. Subsequently the capillary 84 is wetted with uncured epoxy near the bonded end and the sleeve 102 is moved by sliding over the capillary 84 until it fits snugly over the interconnect as shown in FIG. 8b. Additional epoxy 104, 106 is applied and cured to bond the sleeve in place. This results in a reinforced interconnect with improved pull-out characteristics. Apart from improving the pull-out strength, the sleeve 102 provides a flexible transition from the capillary 84 to the epoxy 100 on the Pyrex wafer 78. This leads to lesser amount of wear and tear at the primary point of failure due to repeated flexing of the capillary since the bending does not occur only at one point as in the case of the unreinforced interconnect but is distributed over the length of the sleeve.

The interconnect was inspected visually using optical and scanning electron microscopy to verify that the seal was indeed gas-tight and that the temporary sealing via capillary end deformation worked as expected by avoiding any seepage of epoxy to the channel side of the Pyrex wafer. The epoxy was observed to cover the Teflon-Pyrex interface evenly leading to a gas-tight bond. Another image from the bottom side using an optical microscope showed that there is no seepage of the epoxy on the channel side of the Pyrex wafer 78. Also, minor chipping of the Pyrex wafer 78 around the edge of the inlet 80 or outlet 82 holes during drilling does not affect the sealing. There was no observed blockage of the capillary 84, showing that temporary sealing through the capillary deformation step of FIG. 7b and FIG. 7c worked as expected.

The force required to break the interconnects (both unreinforced and reinforced) was measured by tying the capillary to a pan of known weight and adding weights in the pan till the interconnect broke. It was found that the unreinforced interconnect (FIG. 7d) broke off at a total pulling load of 2.2 Kg (21.56 N) while the reinforced interconnect (FIG. 8b) held well up to a pulling load of 4.12 Kg (40.376 N). At that load the Teflon tubing itself started elongating and thinning and finally broke off, but the interconnect was still operable. Thus the pull out test confirms that the reinforced interconnect is significantly stronger than the unreinforced version. The value of maximum pulling strength is superior to that reported in the literature for other types of microfluidic interconnects.

Figure 9:
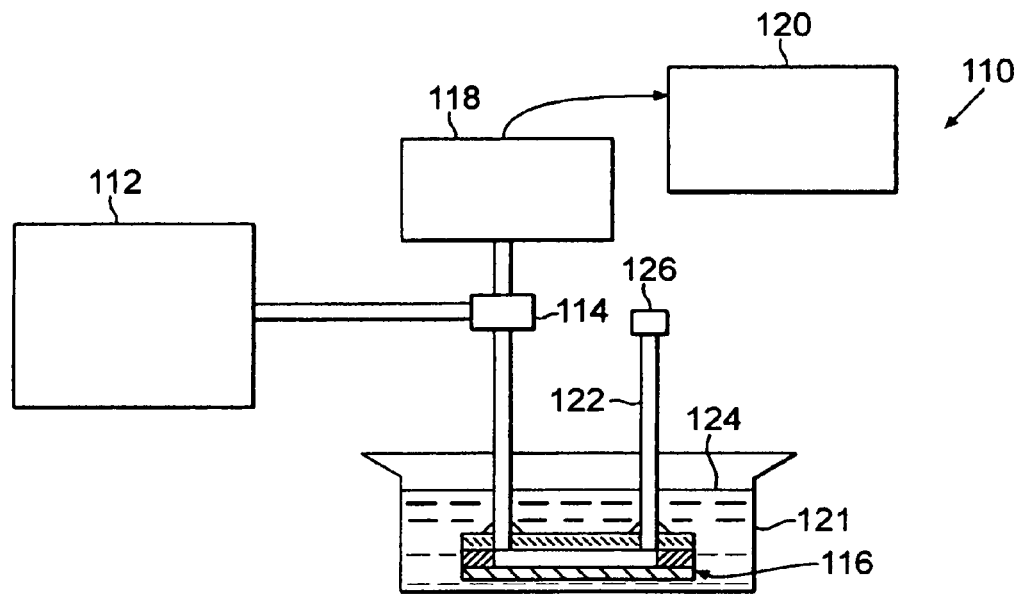
FIG. 9 is a schematic representation of the pressure test apparatus used in the present invention.

The set-up used for carrying out pressure and leak testing of the interconnects is shown schematically as 110 in FIG. 9. It consisted of a syringe apparatus 112 (sold by Hamilton under the trademark Gastight) connected to a T-connector 114 providing a parallel connection to the interconnect on the inlet side of the microfluidic device 116 and a pressure transducer 118 which in turn is connected to a pressure indicating meter 120. The microfluidic device 116 was immersed in a beaker 122 filled with water 124 to monitor any leakage at the interconnect which would lead to the formation of air bubbles at the interconnect point. The capillary 122 connected to the outlet of the microchannel device 116 was capped (plug 126) so that no gas could escape from the outlet side. Thus any compression of the syringe 112 would lead to an increase in pressure inside the microfluidic device and would show up as increasing pressure reading on the indicating meter 120. A syringe pump was used in the syringe apparatus 112 to move the syringe plunger at a constant controlled rate and generate the high pressures at which the testing was to be carried out.

A number of interconnects were fabricated and tested for leakage at high pressures by pressurizing and maintaining the system at the test pressure for several hours to observe any pressure loss in the system. This step was necessary to ensure that there were no visually unobservable minute air bubbles that were leaking out of the system. Unlike the method based on the verification of the linear relationship of pressure v/s inverse volume (Ideal gas law) used by others, this procedure is more accurate for the tested pressures since the ideal gas law is not valid at the high pressures that were applied to the interconnects during this study.

Results from the pressure tests showed that the unreinforced interconnects could operate up to a pressure of at least 315 Psi (21.43 atm) without failure over extended periods of time. This is a significant improvement over the experimentally verified values of 190 kPa (1.87 atm) and 30 Psi (2.04 atm) reported in the literature. It must be noted that 315 Psi was not the pressure at which the interconnects failed. Testing of the interconnects to determine the failure pressure could not be carried out using the existing set-up since higher pressures could not be generated due to stalling of the syringe pump and eventual failure (bursting) of the syringe itself.

The epoxy used in making the interconnect has a maximum service temperature of 315° C. while the etched PTFE has a maximum recommended operating temperature of 280° C. The device was heated up to and maintained at a temperature of 275° C. for several hours to study the effect of high temperature on the overall strength of the interconnect. After exposure to this temperature, pressure/leakage and pull-out tests conducted on the interconnect revealed no significant degradation in properties. Thus the high-temperature stability of the interconnect was confirmed.

Figure 10:
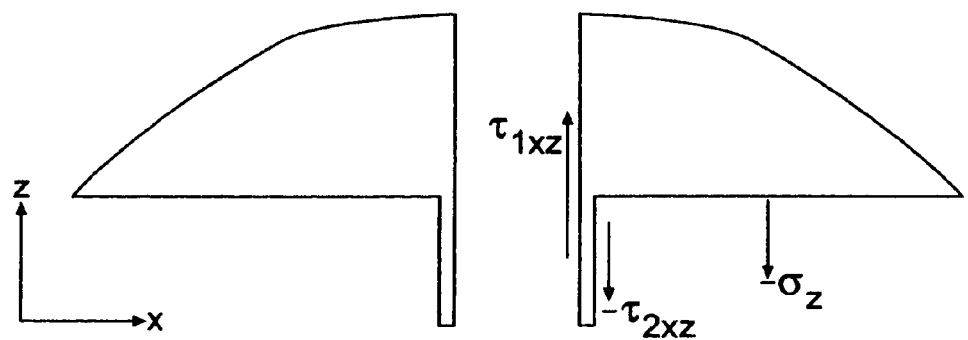
FIG. 10 is a diagram of stresses acting on the epoxy of the interconnect according to the present invention.

It was experimentally verified that the fabricated interconnects withstood significantly higher levels of pressure and pull-out forces in comparison with other designs previously reported in the literature. The main difference between the interconnect disclosed herein and those reported earlier in the literature is that the epoxy is allowed to seep in the gap between the capillary and the Pyrex to a small depth less than the actual thickness of the Pyrex wafer so that it provides additional bond strength without blocking the capillary as shown in FIG. 7d. It might be argued that this thin cylindrical film of cured epoxy significantly improves the high pressure rating and pull-out performance of the interconnect. As illustrated in FIG. 10, the concentric epoxy film can be expected to cause a decrease in the stress concentration in the epoxy bulk since the upward force due to shear stress '$_{T1xz}$' on the epoxy arising out of high pressure conditions in the capillary is balanced by the downward force due to shear stress '$-_{T2xz}$' acting on the cylindrical film of epoxy at the epoxy-Pyrex wafer interface in addition to the downward force due to the tensile stress '$-\sigma_z$' that acts on the planar epoxy surface. In effect, the presence of the epoxy film leads to a smaller 'bending moment' resulting from deformation forces acting on the epoxy bulk when compared with the case in which there is no epoxy film between the Pyrex and the capillary. Also, presence of the epoxy film distributes the shear forces acting on the cylindrical capillary-epoxy interface over a larger contact area leading to a smaller value of effective shear stress '$_{T1xz}$'. Structural analysis of the interconnect to study the relation between capillary loading and the stresses generated inside the epoxy bulk was carried out in order to understand the effects discussed above. For a general 3-dimensional loading case, the stress tensor σ representing the general state of stress inside a body under deformation forces is given by equation (4), where $\sigma_i$ represents the tensile/compressive stresses and $\tau_{ij}$ represent the shear stresses.

$$\sigma = \begin{bmatrix} \sigma_x & \tau_{xy} & \tau_{zx} \\ \tau_{xy} & \sigma_y & \tau_{yz} \\ \tau_{zx} & \tau_{yz} & \sigma_z \end{bmatrix} \quad (4)$$

The static equilibrium conditions are represented by the balance of force equations:

$$-\nabla \cdot \sigma = K = \begin{bmatrix} K_x \\ K_y \\ K_z \end{bmatrix} \ldots \nabla = \overline{X}\frac{\partial}{\partial x} + \overline{Y}\frac{\partial}{\partial x} + \overline{Z}\frac{\partial}{\partial x} \quad (5)$$

where x, y and z are unit vectors in Cartesian coordinates and $K_i$ represent the body forces. The strain conditions at a point ($\epsilon_x$, $\epsilon_y$, $\epsilon_z$, $\epsilon_{xy}$, $\epsilon_{yz}$, $\epsilon_{zx}$, $\gamma_{xy}$, $\gamma_{yz}$ and $\gamma_{zx}$) can be completely described by the deformation components and their derivatives:

$$\epsilon_x = \frac{\partial u}{\partial x} \qquad \epsilon_{xy} = \frac{\gamma_{xy}}{2} = \frac{1}{2}\left(\frac{\partial u}{\partial y} + \frac{\partial v}{\partial x}\right)$$

$$\epsilon_y = \frac{\partial v}{\partial y} \qquad \epsilon_{yz} = \frac{\gamma_{yz}}{2} = \frac{1}{2}\left(\frac{\partial v}{\partial z} + \frac{\partial w}{\partial y}\right) \quad (6)$$

$$\epsilon_z = \frac{\partial w}{\partial z} \qquad \epsilon_{zx} = \frac{\gamma_{zx}}{2} = \frac{1}{2}\left(\frac{\partial w}{\partial x} + \frac{\partial u}{\partial z}\right)$$

where u, v and w are deformation components in the x, y and z directions respectively. The relation between the stress and strain is given by Hooke's Law, $$\sigma_x = \frac{E}{(1+v)}\left(\epsilon_x + \frac{v}{1-2v}(\epsilon_x + \epsilon_y + \epsilon_z)\right); \quad \tau_{xy} = G\gamma_{xy} \quad (7)$$

with similar relations for $\sigma_y$, $\sigma_z$, $\tau_{yz}$ and $\tau_{zx}$. v is Poisson's ratio, E is Young's modulus and G is the Shear modulus defined by $$G = \frac{E}{2(1+v)} \quad (8)$$

Thus all stress and strain components can be derived once the derivative of the deformations have been obtained. To do this, the balance of force can be formulated in terms of the deformation components, resulting in a system of three Navier's equations by combining equations (5), (6), (7) and (8):

$$-\sum_j \left[\frac{\partial}{\partial x_j}G\left(\frac{\partial u_i}{\partial x_j} + \frac{\partial u_j}{\partial x_i}\right) + \frac{\partial}{\partial x_j}\left(\mu\frac{\partial u_j}{\partial x_j}\right)\right] = K_i \quad (9)$$

where i and j denote the space coordinate indices, $x_1$, $x_2$, and $x_3$ denote x, y, and z and $u_1$, $u_2$, and $u_3$ are the deformation components u, v and w. The variable μ is defined as $$\mu = \frac{Ev}{(1+v)(1-2v)} \quad (10)$$

Finally, the structural analysis of the interconnect epoxy based on the maximum-distortion-energy theory is carried out by calculating the maximum value of the von Mises stress $\sigma_{vM}$ given by Equation 11 for different pull-out loads and iterating to find out the highest value of pull-out load for which the maximum value of $\sigma_{vM}$ does not exceed the design yield strength $\sigma_{ys}^{design}$ $$\sigma_{vM} = \sqrt{0.5[(\sigma_1-\sigma_2)^2 + (\sigma_2-\sigma_3)^2 + (\sigma_3-\sigma_1)^2]} \quad (11)$$

In the above equation, $\sigma_1$, $\sigma_2$ and $\sigma_3$ represent the principal stresses, which are actually the eigenvalues of the stress matrix in equation 4. According to the theory, a material will fail when the maximum value of the von Mises stress $\sigma_{vM}$ at any point exceeds the yield stress, $\sigma_{ys}$. The epoxy used for making the interconnect had a $\sigma_{ys}$ of 2000 psi. A design value of 1000 psi (6.895 Mpa) was used as the maximum permissible $\sigma_{vM}^{design}$ for this analysis to study the effects of the presence of the concentric epoxy film.

The geometry of the interconnect was modeled in 3-D and the constitutive equations (5 through 9) were solved using FEMLAB, a generic 3-dimensional geometry modeling, finite element meshing and coupled partial differential equation based analysis software. The boundary conditions used were the appropriate shear stress $_{T1xz}$ based on the pull-out force distributed evenly on the capillary-epoxy-Pyrex wafer interface (see FIG. 7) and zero displacement in the z-direction of the entire epoxy-Pyrex wafer interface. Details regarding the numerical integration of the constitutive equations are available elsewhere.

Figure 11:
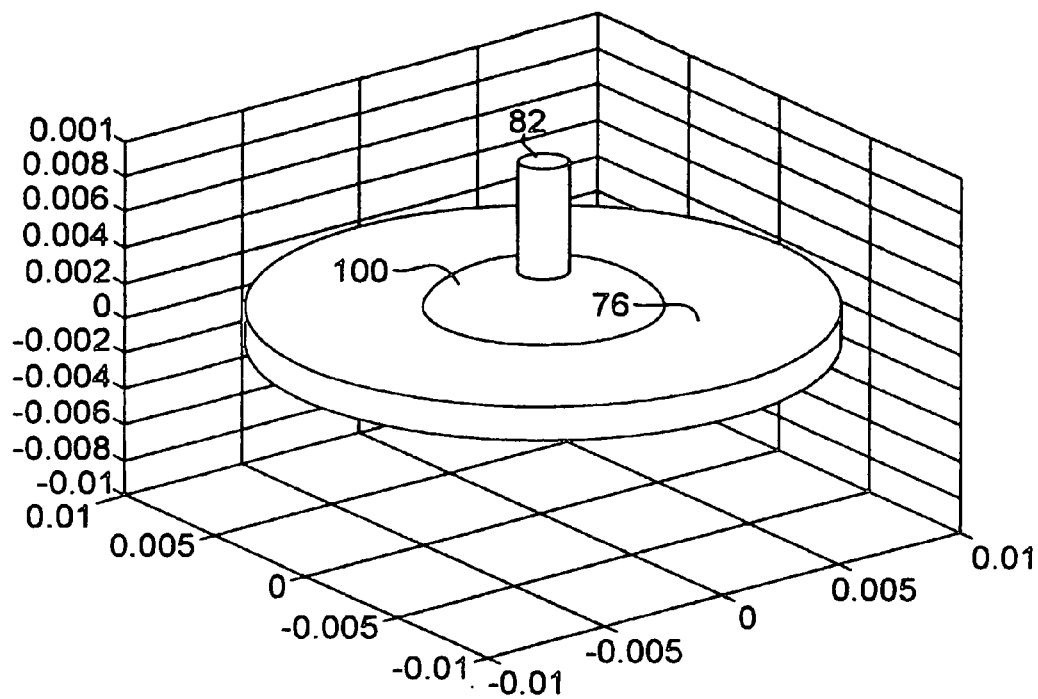
FIG. 11 is a geometric model of an interconnect used in FEM analysis.

The 3-dimensional geometry model used in the finite element based analysis is shown in FIG. 11. Dimensions of the interconnect (the size of the inlet/outlet hole drilled in Pyrex (1.75 mm) and internal and outer diameters of the Teflon capillary (1.07 mm and 1.68 mm) are the same as that of the experimentally fabricated interconnect discussed earlier. The cured epoxy blob extends 4 mm around the outside of the Teflon capillary and is 2 mm high above the Pyrex surface. The depth of the cylindrical epoxy film seeping into the gap between the Teflon and the hole in the Pyrex is 1.05 mm. The thickness of the Pyrex wafer is 1.8 mm.

Since exact values of the parameters E, v and density (p) of the epoxy used in the fabrication were not available to us, representative values for similar two-component based epoxies as outlined in Table 1 were used in the analysis to study the general stressing characteristics of the interconnect.

TABLE 1

Epoxy material property values used in analysis

| Property | Value |
|---|---|
| E | 2.415 Gpa |
| Density (p) | 3000 Kg/m$^3$ |
| v | 0.35 |

TABLE 2

Results from structural modeling and analysis of interconnect

| Design | Pull-out force | Maximum value of $\sigma_{vM}$ |
|---|---|---|
| Concentric epoxy film absent | 1.917 Kg | 6.8950 Mpa |
| Concentric epoxy film present | 1.917 Kg | 4.2674 Mpa |
| Concentric epoxy film present | 3.0975 Kg | 6.8949 Mpa |

Figure 12:
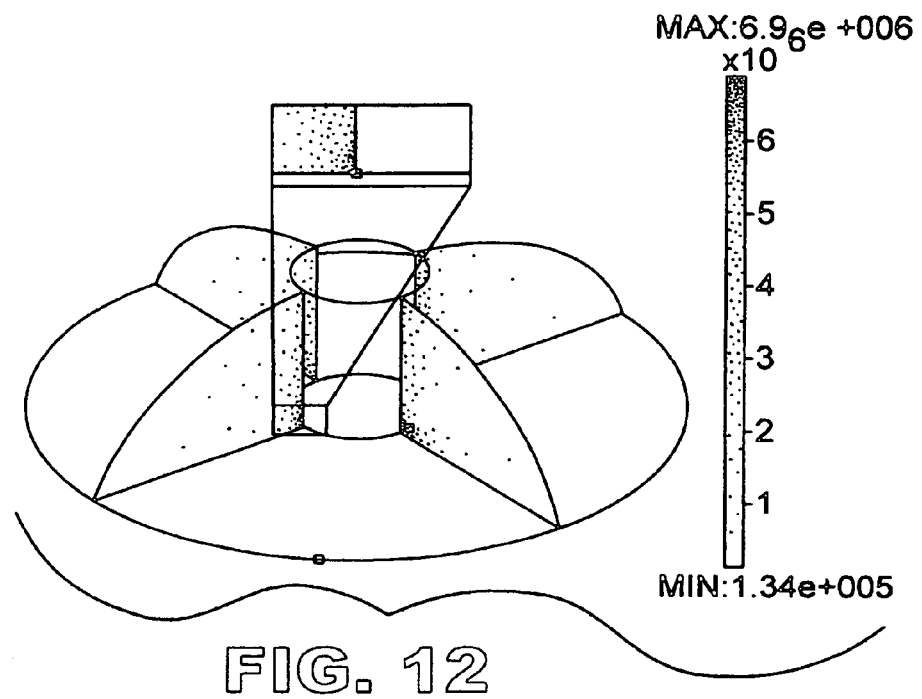
FIG. 12 is a representation of von Mises stress in epoxy (no epoxy Is between capillary and Pyrex hole) for a pull out load of 1.917 kg.
Figure 13:
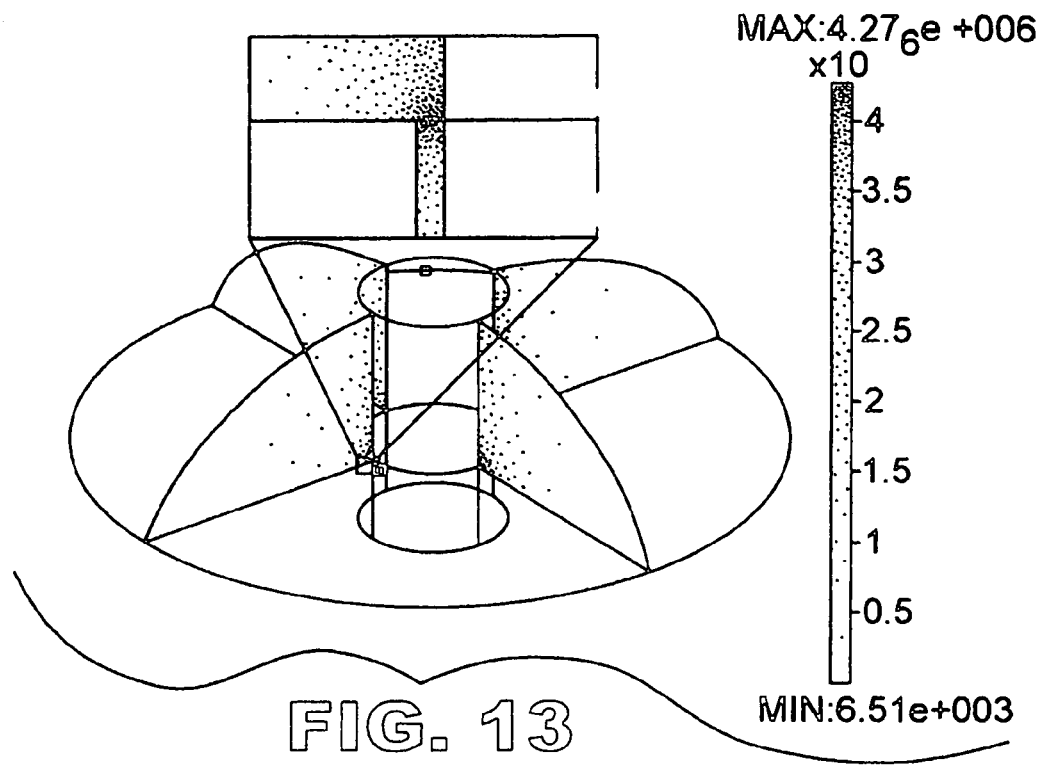
FIG. 13 is a representation of von Mises stress in interconnect epoxy (with concentric epoxy film present between capillary and pyrex hole) for a pull-out load of 1.917 kg.
Figure 14:
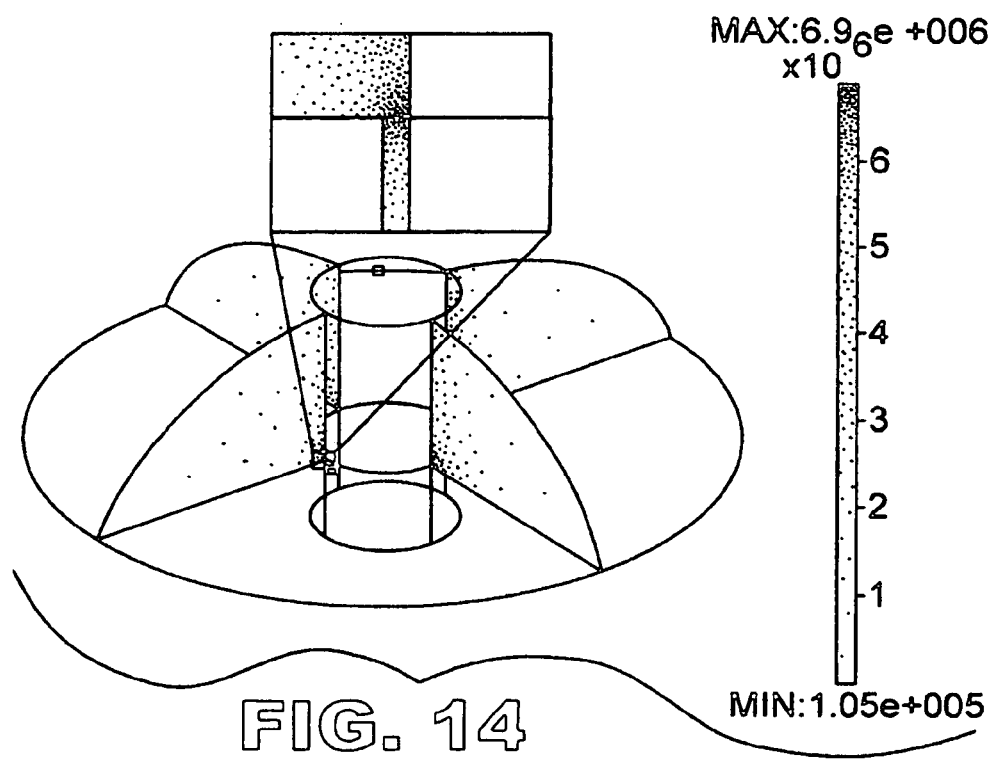
FIG. 14 is a representation of von Mises stress in interconnect epoxy (with concentric epoxy film present between capillary and pyrex hole) for a pull-out load of 3.0975 kg.

Results from modeling the stresses in the epoxy bulk are given in FIGS. 12, 13 and 14 and summarized in Table 2. The figures show variation in the von Mises stress across the epoxy cross section and also the position of the maximum and minimum values. As shown in Table 2, the maximum permissible pull-out force based on a design yield strength $\sigma_{y5}^{design}$ of 1000 psi (6.895 MPa) without the epoxy film present between the capillary and the Pyrex hole is 1.917 Kg, and the presence of the epoxy film improves this value to 3.0975 Kg. FIG. 13 shows the intermediate case in which the load of 1.917 Kg is applied to the capillary with the epoxy film present. The presence of the film significantly lowers the maximum value of $\sigma_{vM}$ from 6.895 MPa to 4.267 MPa. This improvement in interconnect strength is in accordance with the discussion presented above. Since the pull-out force can be said to be resulting from high pressure conditions in the capillary, increase in the pull-out strength of the interconnect would translate into an increase in the maximum pressure rating. The above simulations thus serve as a tool for rigorous analysis of the features which impart desirable characteristics to the interconnect design. A similar approach can be used to model improved designs without actual fabrication, thus considerably speeding up the design process for further improvement of the interconnect. The ease of fabrication of the interconnect without the need for any special micromachining equipment renders it amenable to integration with any microfluidic device production process.

Rigorous testing of the interconnect at different operating temperature and pressure conditions shows that it operates reliably at pressures of up to 315 Psi (21.43 atm) and temperatures of up to 275° C. The interconnect itself is highly chemically inert since the only wetted surfaces in the design are Teflon, Pyrex and silicon. Structural analysis of the interconnect illustrates the effect of the interconnect geometry on its strength and forms a general framework for further improvement of the design.

Figure 15:
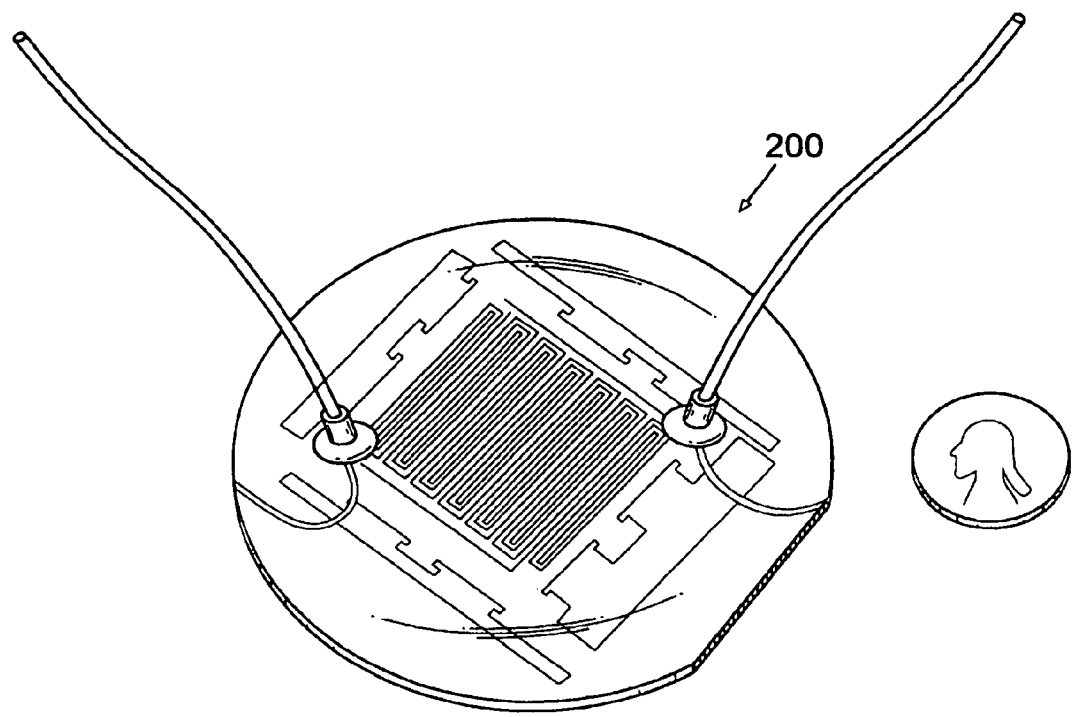
FIG. 15 is a photocopy of a photograph of a device according to the present invention.
Figure 16:
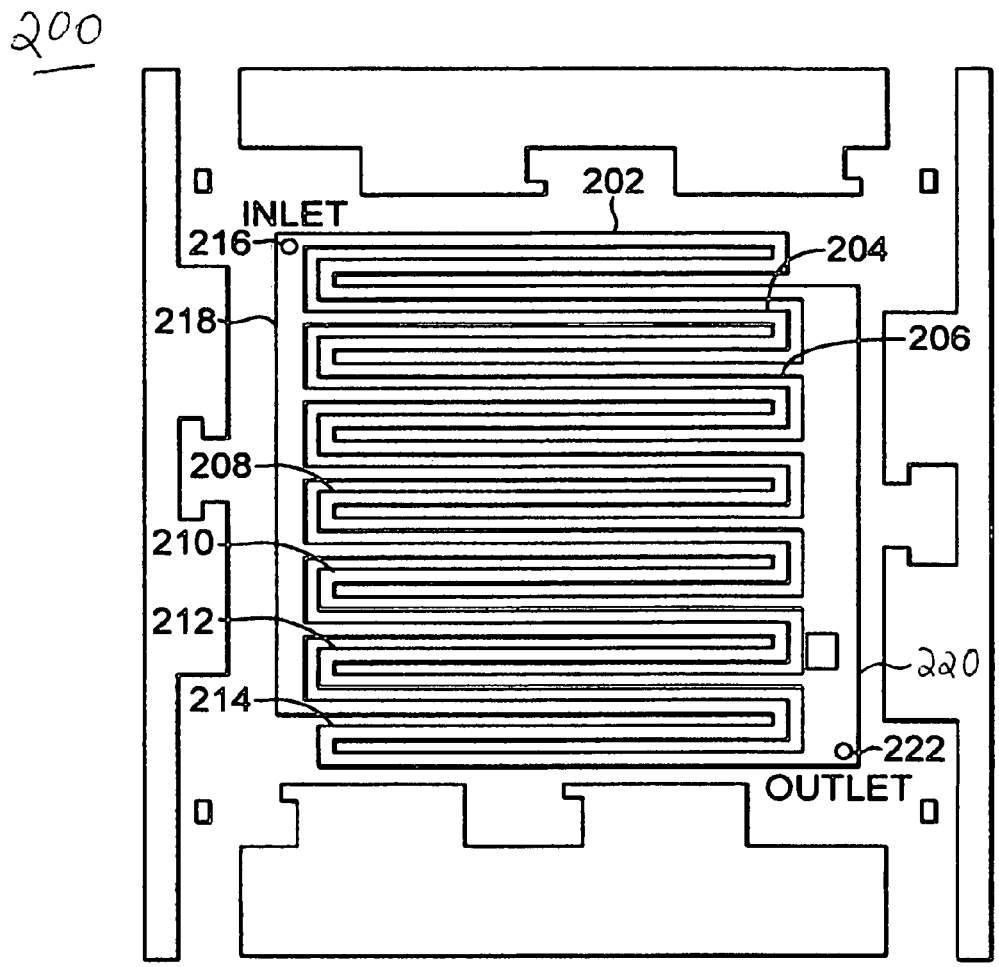
FIG. 16 is a schematic representation of the microchannel and filter portion of the microreactor of FIG. 15.
Figure 16A:
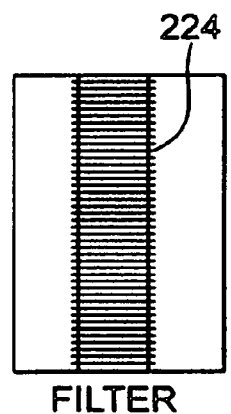
FIG. 16a is an enlarged detail of FIG. 16.

A microreactor 200 according to the invention, fabricated as discussed above, is shown in FIG. 15. Referring to FIG. 16 the microreactor 200 of consists of a network of parallel microchannels 202, 204, 206, 208, 210, 212, 214 having depths ranging from 300 microns to 450 microns etched in a silicon substrate. The channels have an inlet port 216 communicating with an inlet conduit or manifold 218 and outlet manifold 220 and outlet port 222 and are capped by anodically bonding the silicon substrate to a Pyrex wafer as discussed above. This results in a gas-tight seal between the silicon and Pyrex surfaces leading to the formation of conduits for fluid flow. The catalyst (commercially available low temperature shift/methanol reforming catalyst such as Süd-Chemie G-66B or C18-7) is introduced into the reactor by passing a suspension of the particles in water through the microchannels. Desired particle size of the catalyst (mean diameter 50 to 70 microns) is obtained by grinding larger pellets and sieving the powder before making the suspension. A particle filter 224 is shown enlarged in FIG. 16a, consisting of a number of vertical parallel walls with spacing less than the particle diameter fabricated by etching as discussed above, into the silicon substrate and is located upstream of the outlet manifold 220 and close to the outlet port 222. This filter 224 is used to trap the catalyst particles inside the microchannels when the suspension is passed through the channels, thus forming a micro-packed bed of the catalyst. The advantage of using a packing of catalyst particles in the channels instead of coating the channel walls with the catalyst as previously reported in the literature is that the catalyst packing results in catalyst contact area that is several orders of magnitude higher, leading to much higher reaction conversions in a given reactor volume at required reactant flow rates.

The reactor of the present invention can also be fabricated with a separate port or ports to effect catalyst loading of the reactor. Such ports would be sealed after catalyst has been introduced into the microchannels.

The network of parallel microchannels and the locations of the inlet and the outlet on the reactor chip are designed such that the resistance to flow of the reacting gases across all parallel paths is the same. This ensures equal residence times of the reacting gases across parallel paths and results in uniform utilization of the catalyst over the entire chip area. This unique design ensures reasonable pressure drops and desired conversion of the reactants during operation of the microreactor at desired flow rates. The backside of the silicon substrate has heaters and temperature sensors integrated on-chip for temperature control of the microreactor during operation. The temperature sensors are platinum lines used to form a resistance-temperature device (RTD) sensor with a linear temperature-electrical resistance characteristic. The heaters are metal (e.g. platinum) lines meandering on the backside of the etched microchannels. The heaters and temperature sensors are electrically isolated from the silicon substrate by depositing an insulating layer of silicon dioxide before depositing and patterning the platinum metal. These heaters and sensors are designed to be compatible with commercially available temperature controllers for ease of operation.

While most of the fabrication steps described above are considered standard IC industry and MEMS fabrication processes, certain processes integral to the fabrication of the device had to be developed to realize the proposed design. The introduction of the catalyst particles inside the microchannels is one such step that cannot be referred to as 'standard'. Though the idea of passing a suspension of catalyst coated polystyrene spherical beads has been previously published in the literature, there is no report of using this method to pass actual catalyst particles of arbitrary shape to form micro-packed beds of the configuration of the present invention for methanol reforming. The presence of such particles of arbitrary shape in the suspension leads to several problems of channel and filter clogging during the formation of the packed bed if the suspension is not of correct concentration. Also, the region in which the packing is denser leads to high pressure drops for flow of the suspension liquid (water) making it impossible to continue with the flow of the suspension to form the packing. This problem is circumvented by connecting the device outlet to a vacuum pump while maintaining the device at an elevated temperature (close to 100° C.) and pressurizing the inlet side suspension to above atmospheric pressure. The vacuum pump lowers the boiling point of the water near the outlet to below 100° C., causing it to vaporize. The generated water vapor easily passes on to the vacuum pump due to its low viscosity in comparison with liquid water, creating more space for further introduction of the suspension. This process is carried out until the entire channel network gets packed with the catalyst microparticles.

Another method of packing the catalyst particles involves the use of a carrier gas (such as compressed air) to suspend the catalyst particles and transport them with the flowing gas stream to obtain the packing inside the micro-reaction chambers. This method works very well with the microreactor having a radial flow configuration (discussed below) due to the ease of flow of the carrier gas in the radial direction (less length of travel of suspended particles before they become part of the immobilized packing).

Another non-standard part of the method of fabricating the device of the present invention is the interfacing of fluid inlet and outlet ports for transport of the reactants and products. Though several ideas have been proposed in the literature for microfluidic interfacing of such devices, none of the prior proposed designs were found to be suitable for the high temperature and pressure conditions at-which the microreformer operates. Conventional interfacing/interconnection techniques involving the use of Swagelok connections results in bulky designs that are not suitable for compact (portable) applications. Thus the novel microfluidic interconnectors developed for this purpose and discussed above ensure reliable operation of the device.

As mentioned above, the catalyst used was Sud-Chemic G-66B Cu/ZnO low temperature shift catalyst. Cu/ZnO/Al$_2$O$_3$ based catalysts (e.g., Sud-Chemie C18-7) were also tried and gave excellent results. These are commercially available standard Low Temperature Shift (LTS) catalysts. The fresh catalyst charge has to be carefully reduced prior to use for the first time, usually by reacting a methanol/water feed at a temperature gradually increased from 150° C. up to 175° C. over a period of about ten hours of operation. Due to the presence of the transparent Pyrex capping wafer, the catalyst activation can also be observed visually via a change in color of the catalyst powder from black to yellowish-brown.

After the catalyst activation phase, the operating temperature of the microreactor was raised up to about 195-200° C., at which point the hydrogen production rate steadily rose till most of the reactor exit gas was hydrogen. In order to avoid problems of liquid condensation in the mass-spectrometer inlet capillary and to determine the exact methanol conversion rate, the unreacted methanol and water were collected by a condensing unit connected between the reactor outlet and the gas analyzer.

Figure 17:
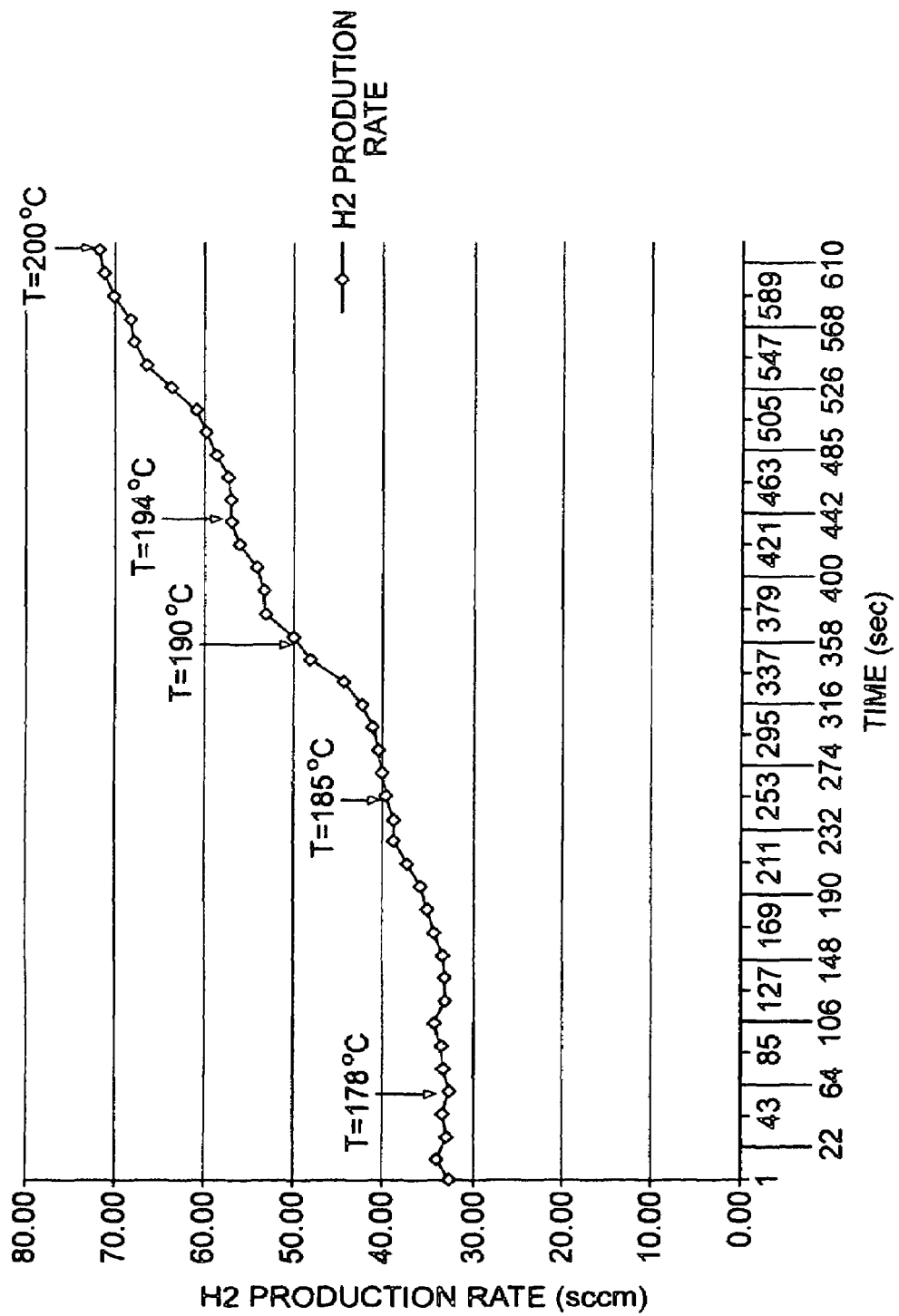
FIG. 17 is a plot of Hydrogen production against time illustrating operation of a device according to the present invention.
Figure 18:
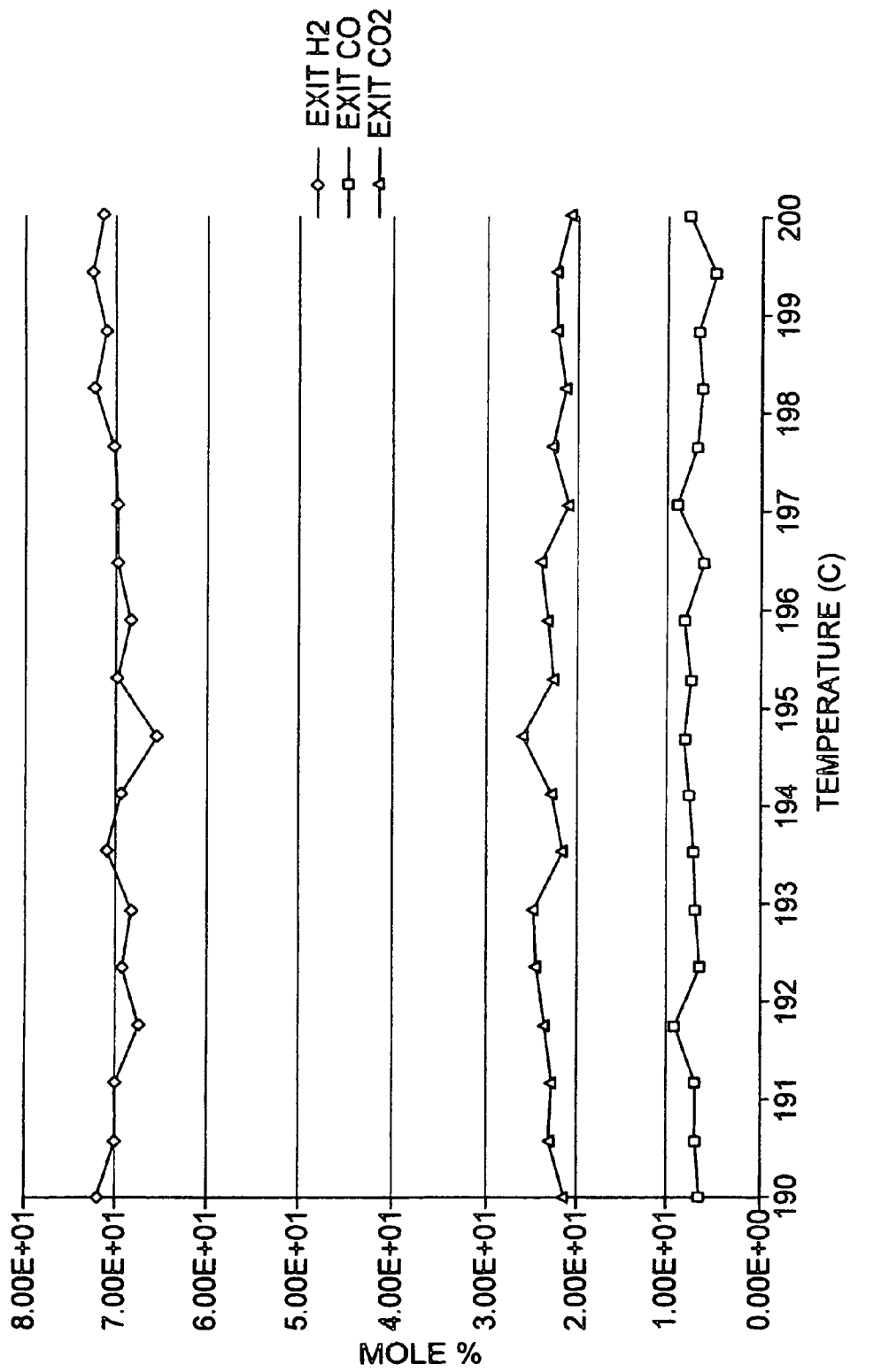
FIG. 18 is a plot of mole percent against temperature illustrating use of a device according to the present invention.

FIGS. 17 and 18 show the results from a typical reaction run of the microreactor in the form of plots of hydrogen production rate v/s time at different temperatures (FIG. 17) and composition of the reacted gas measured inside the mass-spectrometer ion-trap v/s operating temperature of the microchannel device (FIG. 18).

Data collection was started towards the end of the catalyst activation phase, about 10 minutes before the temperature was raised to the operating value of 195° C.

During the steady state operation at 200° C. for the reaction run shown, 2.5 ml of 1:1.5 molar CH$_3$OH:H$_2$O was passed through the microreactor at a flow rate of 5 cc/hr of the liquid mixture. The liquid mixture inside the syringe pump prior to feeding into the microreactor was maintained at the room temperature of 20° C., resulting in the feed liquid specific gravity of 0.9067 gm/cc. This translates into a methanol feed rate of 2.46 gm/hr (0.076875 mol/hr) and a total methanol feed of 1.23 gm. On the exit side, all methanol and water was condensed and collected as liquid before the gases were mixed with 1.5 SLPM of argon and sent to the mass spectrometer for analysis. The net amount of liquid thus collected was 0.7 ml, with a measured specific gravity of 0.9643 gm/cc at 20° C. Using methanol-water mixture specific gravity data, this mixture was found to contain 21.53% CH$_3$OH by weight. Thus the total amount of unreacted methanol collected at the microreactor exit for this run was 0.1453 gm. The methanol conversion ($X_{CH3OH}$) for this run can be calculated as shown below:

$$X_{CH_3OH} = \frac{(1.23 - 0.1453)}{1.23} = 88.19\% \quad (12)$$

The net hydrogen production rate for this run was 0.1764 mol/hr. From the point of view of fuel cell requirement, a 20 Watt fuel cell operating at 80% efficiency needs a hydrogen flow rate of 0.372 mol/hr. Thus the above reaction run provides enough hydrogen for generating 9.48 Watts of power in the fuel cell.

It was observed that for reaction runs in which the molar methanol to water feed concentrations were more than 1:1.5, the amount of CO and CO$_2$ at the microreactor exhaust was less than that expected from stoichiometry (Eqn. 1). Based on thermodynamic considerations, the microreactor was operating within the region of possible carbon deposition inside the reaction chamber, which would lead to lower than stoichiometric composition of CO and CO$_2$ at the reactor outlet. Carbon deposition is undesirable as it will lead to catalyst deactivation over time. However, this can be avoided by either increasing the water-to-methanol feed ratio as shown by the plot of FIG. 17 using a water-methanol feed of 1.5:1 (higher net storage volume for given amount of stored methanol) or carrying out the reaction at higher operating temperatures (requiring better thermal isolation to avoid higher heat loss).

A silicon-chip based microreactor was successfully developed and tested for in-situ and on-demand production of hydrogen. A number of macro-scale chemical engineering concepts were implemented at the micro scale to create a proto-type chemical plant-on-a-chip. On-chip integration of various components such as heaters/sensors, reaction chambers, catalyst particle filters and microfluidic interconnectors was used for overall miniaturization as well as to ensure accurate monitoring and control of microreactor operation. Preliminary runs of the microreactor demonstrated that a single chip was sufficient to supply hydrogen to an 8 to 10 watt fuel cell with a methanol to hydrogen conversion of 85 to 90%.

Microreactors can be used in a number of different areas where miniature scale chemical processing is desirable, such as portable chemical analysis units, units for on-demand manufacture of minute amounts of hazardous chemicals which can be produced from less toxic reagents and applications where it is desirable to store chemicals in the form of unreacted components due to ease and portability of storage. Microreactors also provide significantly higher surface area to volume ratios compared to conventional reactors and can be used to implement new reaction pathways not previously possible using conventional chemical reactors.

While developing the microreactor to satisfy a number of design constraints, other discoveries concerning the operation of the device were made and analyzed/understood using rigorous theoretical modeling and analysis. The further discoveries have been used to arrive at improved designs and obtain higher throughputs and conversions in progressively smaller reactor volumes.

Figure 19:
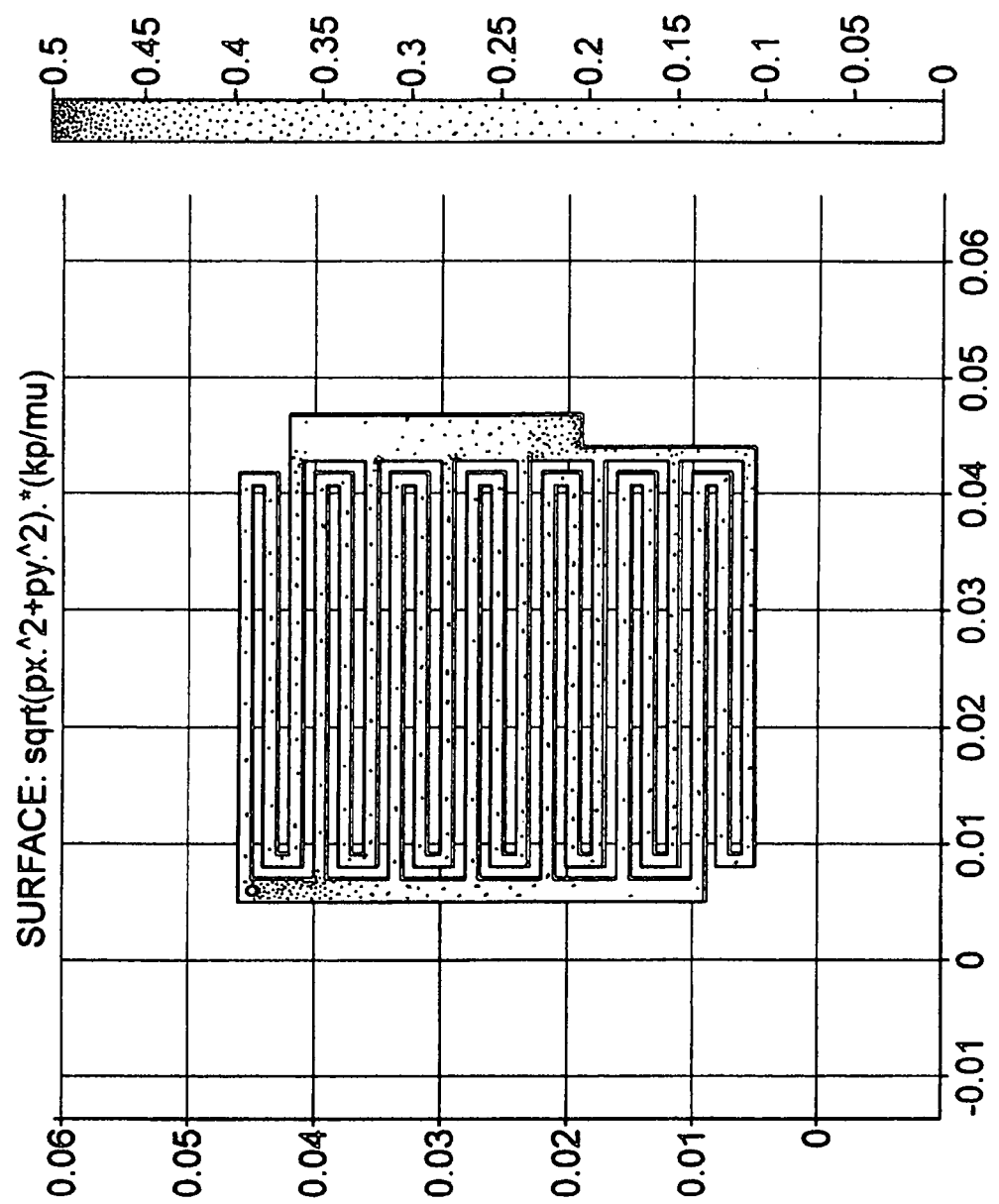
FIG. 19 is a plot showing variation in velocity magnitude of the flowing gases across a reactor according to the present invention.

For example, considering the various physical and chemical phenomena occurring inside the device during operation led to several ways in which the first prototype design (network of parallel microchannels) can be further improved. The methanol reforming reaction causes an increase in the total number of moles of the reaction mixture, leading to an increase in gas mixture volume at a given pressure. The result of this is an increase in the gas flow velocity towards the end of the microchannels as the inlet gases react and move closer to the outlet. At the same time, the pressure decreases as the gas moves closer to the outlet (due to the presence of a pressure gradient which drives the flow) and this causes a further increase in the gas volume flow rate and gas flow velocity. This second effect is demonstrated by the gas flow velocity profile shown in FIG. 19, where the gas flow velocity magnitude is higher as the reactants move closer to the outlet in each of the seven microchannels due to gas expansion. The result of both these effects is that higher velocity in local regions closer to the outlet leads to a smaller residence time in these regions resulting in lower catalyst utilization. In effect, the catalyst utilization is not optimal in that sense across the entire reactor area.

This problem has been resolved by having radial flow microreactor configurations that compensate for 1) the expected gas expansion due to the presence of a pressure gradient and 2) the increase in total number of moles due to is reaction by having a variable (increasing) flow cross section along the reaction path length. In the same context, the bulk of the pressure drop in the microreactor occurs in high gas velocity regions, so such a design also leads to lower pressure drops for a given throughput rate and allows for higher hydrogen production rates in a given microreactor volume.

Figure 20:
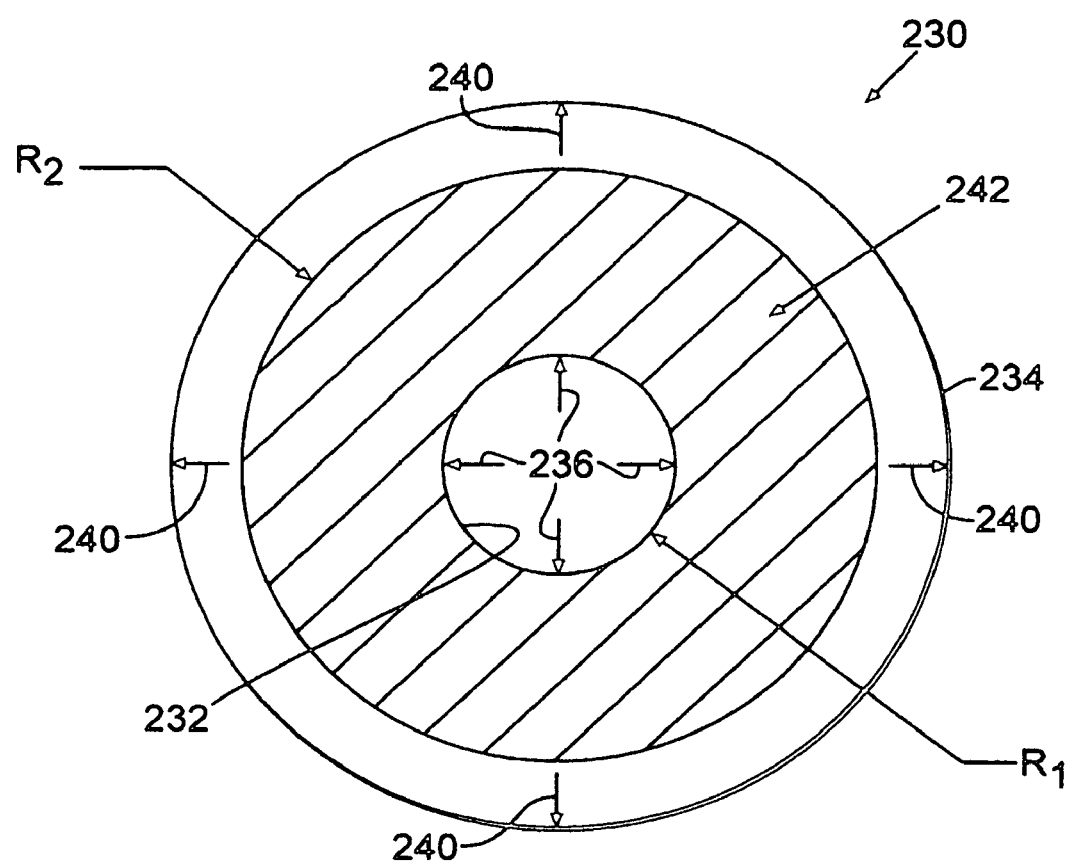
FIG. 20 is a schematic representation of an alternate embodiment of the present invention in a radial configuration.

A microreactor 230 (FIG. 21) was developed with a radial flow configuration in which the gases move outward from the smaller inner circular boundary to the larger outer circular boundary as shown schematically in FIG. 20. This results in a constantly increasing flow cross section which counters the effects of high velocity magnitude concentration closer to the outlet and also results in a significantly lower pressure drop for a given throughput. Rigorous coupled flow and reaction kinetics simulations are used to calculate the values of radii 'R1' and 'R2' (FIG. 20) for uniform flow along the reaction path at desired flow rates. Preliminary experiments have shown that such a device can be operated at throughputs of at least five to six times those possible using the microchannel network configuration with significantly lower pressure drops. (At the same reactant feed flow rate, the pressure drop for the radial configuration is less than one-sixth of that for the microchannel network design. Typical values are 8-12 psi for the radial flow reactor versus 70-75 psi for the microchannel network at an inlet flow rate of 5 cc/hr of 1:1 molar methanol-water liquid mixture). The fabricated device is shown in FIG. 21.

The microreactor 230 with a radial flow configuration in which the gases move outward from the smaller inner circular boundary to the larger outer circular boundary is shown schematically in FIG. 20. A constantly increasing flow cross section extends from inlet 232 to outlet 234 which will counter the effects of high velocity magnitude concentration closer to the outlet 234 and also result in a significantly lower pressure drop for a given throughput. Arrows 236 show the inlet flow where the reactants are exposed to the catalyst bed 242 and arrows 240 show the outflow of the product of the reactions collected through the generally circular or annular outlet 234. Rigorous coupled flow and reaction kinetics simulations are used to calculate the values of the radii of the device for uniform flow along the reaction path at desired flow rates. Preliminary calculations suggest that such a device could be operated at throughputs of at least five to six times those possible using the parallel microchannel device described above.

Figure 21:
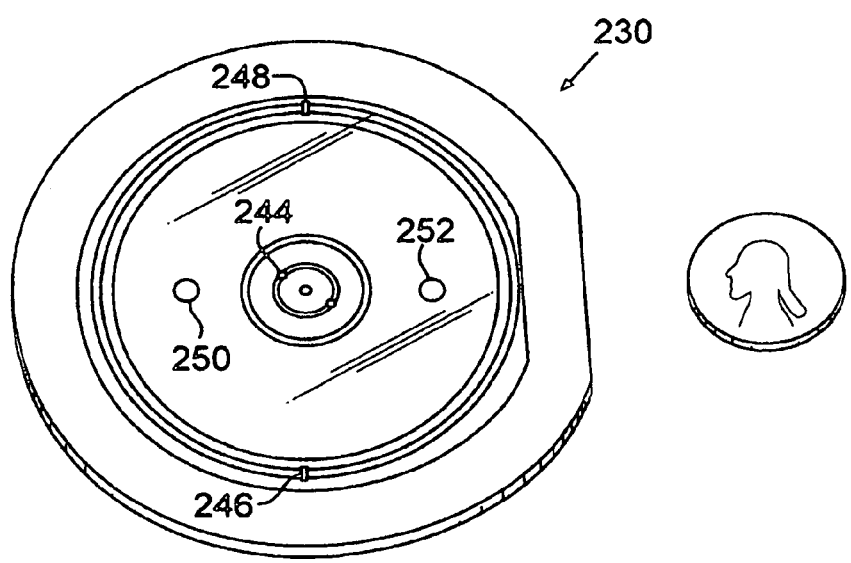
FIG. 21 is a photocopy of a photograph of an actual device according to the present invention in a radial configuration.

FIG. 21 shows a device having the radial flow configuration constructed according to the present invention. In addition to the internal configuration illustrated in FIG. 21 the capping wafer of microreactor 230 was provided with fluidic interconnect inlet port 244 and fluidic interconnect outlet ports 246, 248. The device of FIG. 21 was also provided with separate catalyst loading ports 250, 252.

A microreactor according to the present invention can be fabricated from materials other than silicon. Such materials would include, but not be limited to metals, metal alloys, ceramics, plastics and glass. The present invention is the configuration of the microchannel conduits be they serpentine or radial, the size on characteristic dimensions of the reaction chambers which can be on the order of 10 μm to 2000 μm, the method of microfluidic interfacing and the method of catalyst loading, all of which result in packed micro beds of unique configurations.

Having thus described our invention what is desired to be secured by Letters Patent of the United States is set forth in the appended claims.

What is claimed:
1. A microreactor comprising:
a substrate of silicon or other micromachinable material;
at least two interconnected and parallel paths formed in the substrate, said paths being parallel generally serpentine paths extending from a common inlet to a common outlet, wherein each path defines a resistance to the flow of fluid flowing thereacross and the resistance of all paths is substantially equal to promote equal residence time of fluids flowing across each of said parallel paths;
a filter for trapping catalyst particles positioned proximate to said outlet of said reactor;
a wafer positioned on the substrate to conceal the parallel paths, said wafer including a first aperture extending through a thickness dimension of the wafer and corresponding in location to the common inlet of the substrate and a second aperture extending through the thickness dimension of the wafer and corresponding in location to the common outlet of the substrate; and
a capillary tube mounted to each aperture of the wafer, each capillary tube including a first portion having a relatively larger diameter than a second portion, said first portion of each capillary tube being positioned in sealing contact with a wall surface of a respective aperture.

2. The microreactor of claim 1 further comprising a finely divided catalyst loaded in said paths.

3. The microreactor of claim 1 wherein each of said paths has one of a width or depth between 10 to 2000 micrometers.

4. A microreactor comprising in combination:
a substrate having micro-machined therein a plurality of separate microchannels, each microchannel extending from a common inlet to a common outlet of said reactor, wherein each microchannel defines a resistance to the flow of fluid flowing therethrough and the flow resistance of each of the microchannels is substantially equal;
a filter proximate an outlet conduit of said reactor to prevent catalyst particles loaded into said microchannels from passing out of said reactor;

a means to effect a gas tight seal separately with each of said inlet and said outlet of said reactor; and a wafer positioned on the substrate to conceal the plurality of separate microchannels, said wafer including a first aperture extending through a thickness dimension of the wafer and corresponding in location to the common inlet of the substrate and a second aperture extending through the thickness dimension of the wafer and corresponding in location to the common outlet of the substrate, wherein the means to effect a gas tight seal comprises a capillary tube mounted to each aperture of the wafer, each capillary tube including a first portion having a relatively larger diameter than a second portion, said first portion of each capillary tube being positioned in sealing contact with a wall surface of a respective aperture.

5. A microreactor according to claim 4 wherein each of said microchannels has one of a width or depth between 10 and 2000 micrometers.

6. A microreactor according to claim 4 further comprising means to heat said microchannels.

7. A microreactor according to claim 4 further comprising a finely divided catalyst loaded into said microchannels.

8. A method of catalyst loading of a microreactor according to claim 1, comprising the steps of:
  a) preparing a fluid-based suspension of catalyst particles of a desired particle size range;
  b) introducing said suspension into one of said inlet of said reactor or a catalyst introduction port communicating with said paths under pressure while drawing a vacuum at said outlet of said reactor; and
  c) continuing step (b) until said paths are packed with catalyst.

9. A method for producing hydrogen by reaction of methanol and water vapor in the presence of a catalyst comprising the steps of:
  a) loading the paths of a microreactor according to claim 1 with a low temperature shift/methanol reforming catalyst;
  b) heating said reactor to a temperature of from 195° C. to 275° C.;
  c) introducing methanol and water vapor into the inlet of said reactor; and
  d) withdrawing a hydrogen rich product stream from the outlet of reactor.

10. A microreactor comprising:
  a substrate having a substantially circular configuration and a substantially planar surface;
  a substantially circular inlet port defined on the substantially planar surface of the substrate and positioned in a central region of the substrate;
  a circumferential outlet spaced apart from the inlet port at a radial distance greater than the radius of the inlet port;
  an annular flow passage defined along an entire circumference of the substantially planar surface of the substrate at a location between the inlet port and the outlet; and
  an annular catalyst bed positioned on the substantially planar surface of the substrate and along the annular flow passage.

11. A method of making the microreactor of claim 10, comprising:
  a) etching an annular region in a substrate to form a radial flow reaction chamber;
  b) forming a filter for trapping catalyst particles near each of the inner and outer circular boundaries of the annular reaction chamber; and
  c) flowing a fluid (gas/liquid)-based suspension of catalyst particles through said annular region to form a packed bed of the catalyst.

12. A method for producing hydrogen by reaction of methanol and water vapor in the presence of a catalyst comprising the steps of:
  a) loading a reaction chamber of a microreactor according to claim 10 with a low temperature shift/methanol reforming catalyst;
  b) heating said microreactor to a temperature of from 195° C. to 275° C.;
  c) introducing methanol and water vapor into the inlet of said radial flow microreactor; and
  d) withdrawing a hydrogen rich product stream from the outlet of said microreactor.

13. A method of manufacturing a microreactor comprising the steps of:
  patterning a first side of a silicon substrate to form a plurality of interconnected reaction channels, each reaction channel defining a generally serpentine path extending between a common inlet and a common outlet, each of the channels having a substantially equal resistance to a flow of fluid flowing through the said channels;
  patterning the first side of the silicon substrate to form a filter upstream of an exit port for said channels;
  patterning a second side of said substrate to form trenches for conductive metal heater lines or conductive metal temperature sensor lines;
  bonding a first capping wafer having an inlet port and an outlet port to said first side of said substrate to create closed channels, said inlet for said first capping wafer corresponding to said common inlet of said channels, said outlet for said first capping wafer corresponding to said common outlet for said channels;
  inserting and bonding capillary tubes in said inlet and said outlet ports on said first capping wafer;
  depositing conductive metal lines in said trenches on said second side of said substrate;
  bonding a second capping wafer having ports to accommodate electrical leads connected to said metal lines, to said second side of said substrate; and
  introducing a catalyst into said channels of said microreactor.

14. A method according to claim 13 further comprising the step of bonding connection pads to said second side of said substrate to enable connecting said heater/sensor lines to a controller.

15. A method according to claim 13, wherein said conductive metal comprises platinum or a platinum containing alloy.

16. A method for preparing a catalyst bed in a microreactor according to claim 1, wherein said catalyst bed consists of a low temperature shift/methanol reforming catalyst and the microreactor is to be used to react methanol and water vapor in said catalyst bed to produce hydrogen, said method comprising the steps of:
  preheating said catalyst bed to about 150° C.;
  reacting a methanol water feed mixture in said catalyst bed as the temperature of said bed is raised from about 150° C. to about 175° C.; and
  continuing said reaction of said mixture until said catalyst is activated.

17. A method according to claim 16 further comprising the step of raising the temperature of the catalyst bed to operating temperature after activation of said catalyst bed.

18. A method according to claim 11, wherein the step of forming the filter comprises etching parallel grooves in the substrate wherein said grooves are of a width less than the catalyst particle diameter.

19. A method for preparing a catalyst bed in a microreactor according to claim 10, wherein said catalyst bed consists of a low temperature shift/methanol reforming catalyst and the microreactor is to be used to react methanol and water vapor in said catalyst bed to produce hydrogen, said method comprising the steps of:

preheating said catalyst bed to about 150° C.;

reacting a methanol water feed mixture in said catalyst bed as the temperature of said bed is raised from about 150° C. to about 175° C.; and continuing said reaction of said mixture until said catalyst is activated.

20. A method according to claim 19 further comprising the step of raising the temperature of the catalyst bed to operating temperature after activation of said catalyst bed.

21. The microreactor of claim 10 further comprising a methanol and water vapor supply fluidly coupled to the inlet port for delivering a methanol and water vapor mixture through the inlet port of the substrate.

22. The microreactor of claim 1 further comprising an inlet manifold communicating between the common inlet and the inlet of each serpentine path.

23. The microreactor of claim 1 further comprising an outlet manifold communicating between the common outlet and the outlet of each serpentine path.

24. The microreactor of claim 10 further comprising at least one outlet port defined in a capping wafer, said capping wafer being bonded to the substantially planar surface of the substrate, the at least one outlet port being positioned to receive reaction products formed during operation of the microreactor from said circumferential outlet.

25. The microreactor of claim 24 further comprising multiple outlet ports symmetrically positioned about said circumferential outlet.

26. The microreactor of claim 1 further comprising an adhesive situated within an annular gap defined between an exterior surface of the second portion of each capillary tube and a wall of a respective aperture to effect a gas tight seal with each of said common inlet and said common outlet of said reactor.

27. The microreactor of claim 4 wherein the means to effect a gas tight seal further comprises an adhesive situated within an annular gap defined between an exterior surface of the second portion of each capillary tube and a wall of a respective aperture.

* * * * *